United States Patent
Hashiba et al.

(10) Patent No.: US 9,835,155 B2
(45) Date of Patent: Dec. 5, 2017

(54) SEALING OF A GEAR PUMP

(71) Applicants: DENSO CORPORATION, Kariya, Aichi-pref. (JP); ADVICS CO., LTD., Kariya, Aichi-pref. (JP)

(72) Inventors: Takashi Hashiba, Nishio (JP); Naoki Hakamada, Anjo (JP); Takahiro Naganuma, Kariya (JP); Tomoaki Kawabata, Takahama (JP)

(73) Assignee: ADVICS Co., Ltd., Kariya (JP)

( * ) Notice: Subject to any disclaimer, the term of this patent is extended or adjusted under 35 U.S.C. 154(b) by 250 days.

(21) Appl. No.: 14/796,198

(22) Filed: Jul. 10, 2015

(65) Prior Publication Data

US 2016/0010645 A1   Jan. 14, 2016

(30) Foreign Application Priority Data

Jul. 11, 2014  (JP) ................. 2014-143263
Jan. 23, 2015  (JP) ................. 2015-011607
Jan. 23, 2015  (JP) ................. 2015-011608

(51) Int. Cl.
| | |
|---|---|
| F04C 15/00 | (2006.01) |
| F04C 2/10 | (2006.01) |
| B60T 7/04 | (2006.01) |
| B60T 13/14 | (2006.01) |
| B60T 13/66 | (2006.01) |

(Continued)

(52) U.S. Cl.
CPC ......... *F04C 15/0019* (2013.01); *B60T 7/042* (2013.01); *B60T 8/4031* (2013.01); *B60T 13/146* (2013.01); *B60T 13/662* (2013.01); *B60T 13/686* (2013.01); *B60T 17/02* (2013.01); *F04C 2/102* (2013.01); *F04C 15/0034* (2013.01); *F04C 15/0057* (2013.01)

(58) Field of Classification Search
CPC .................... F04C 15/0019; F04C 15/0034
See application file for complete search history.

(56) References Cited

U.S. PATENT DOCUMENTS 8,388,328 B2 *  3/2013  Yamaguchi ........... B60T 8/3655
                                                       418/104
8,678,798 B2 *  3/2014  Nakamura .......... F04C 15/0038
                                                       418/104

(Continued)

FOREIGN PATENT DOCUMENTS

JP          2014025352          2/2014

*Primary Examiner* — Mary A Davis
(74) *Attorney, Agent, or Firm* — Knobbe, Martens, Olson & Bear, LLP

(57) ABSTRACT

A gear pump apparatus includes a gear pump and a sealing mechanism which includes an annular rubber member, an outer member, and an inner member. One of the outer member and a casing of the gear pump apparatus has a contact member located outside a portion of the outer member which contacts the gear pump in a radial direction of the gear pump. The contact member is placed to create a physical contact between the outer member and the casing to absorb a part of force by which the outer member is pressed against the gear pump. This results in a decrease in pressure acting on an area of contact between the outer member and the gear pump, which leads to a drop in resistance to sliding between the gear pump and the outer member, thus decreasing a loss of torque required for the pumping operation of the gear pump.

13 Claims, 11 Drawing Sheets

(51) Int. Cl.
*B60T 13/68* (2006.01)
*B60T 17/02* (2006.01)
*B60T 8/40* (2006.01)

(56) References Cited

U.S. PATENT DOCUMENTS

| | | | |
|---|---|---|---|
| 8,747,089 B2 * | 6/2014 | Nakamura | F04C 15/0034 |
| | | | 418/104 |
| 9,046,102 B2 * | 6/2015 | Naganuma | F04C 15/0026 |
| 9,297,378 B2 * | 3/2016 | Ando | F04C 2/102 |
| 9,556,869 B2 * | 1/2017 | Hashiba | F04C 15/0023 |
| 2014/0030132 A1 | 1/2014 | Naganuma et al. | |
| 2014/0178234 A1 * | 6/2014 | Kawabata | F04C 15/0034 |
| | | | 418/104 |

* cited by examiner

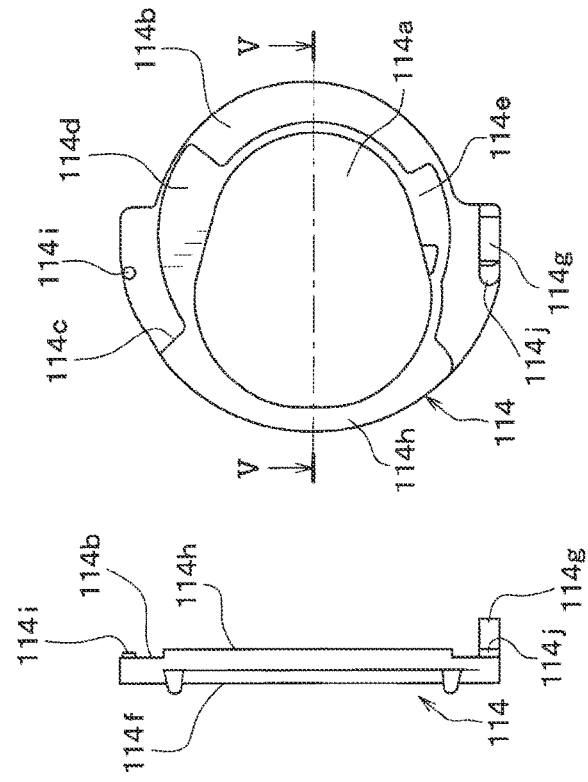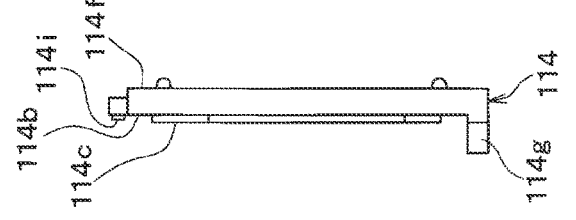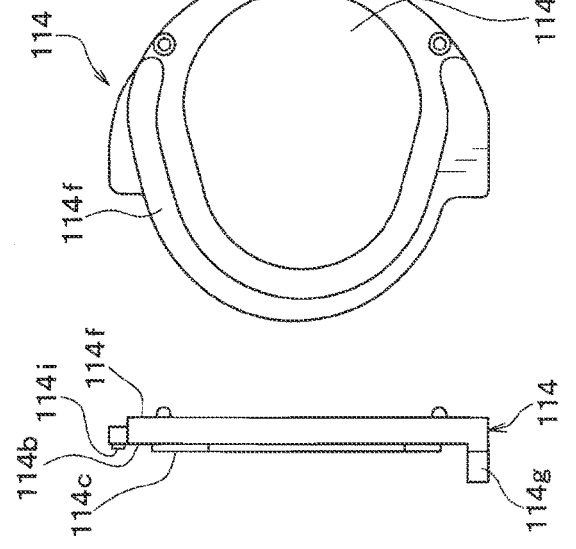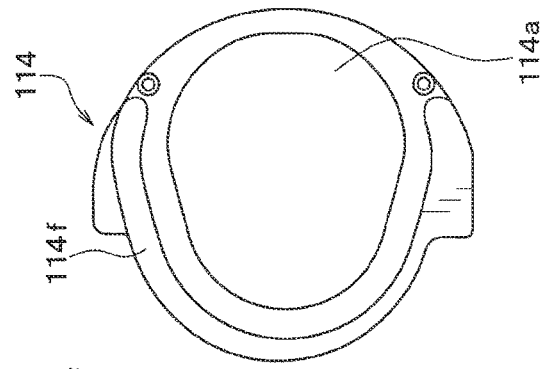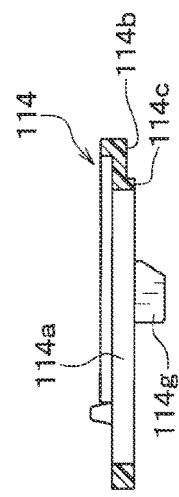

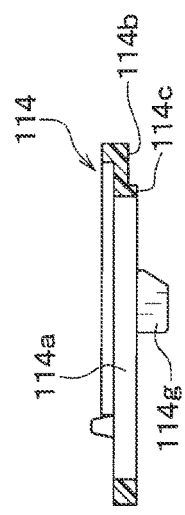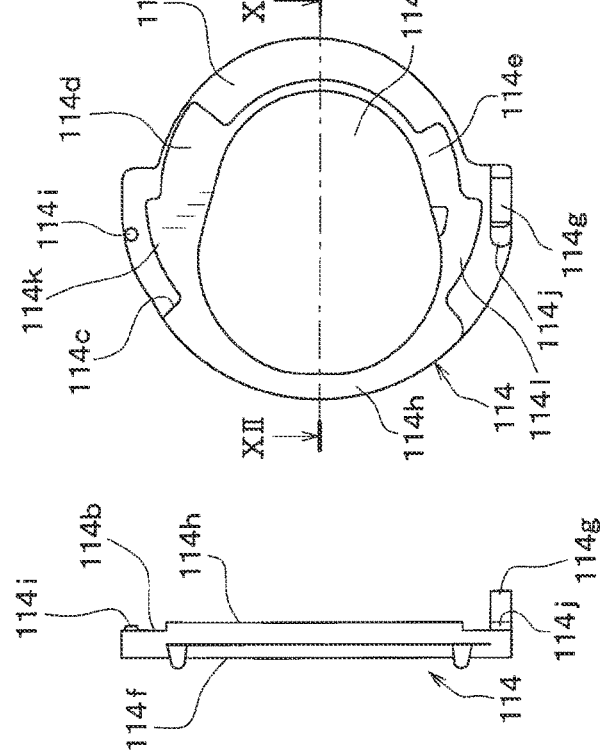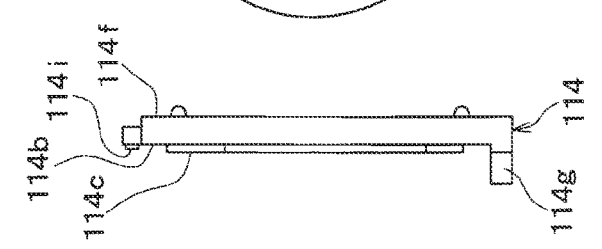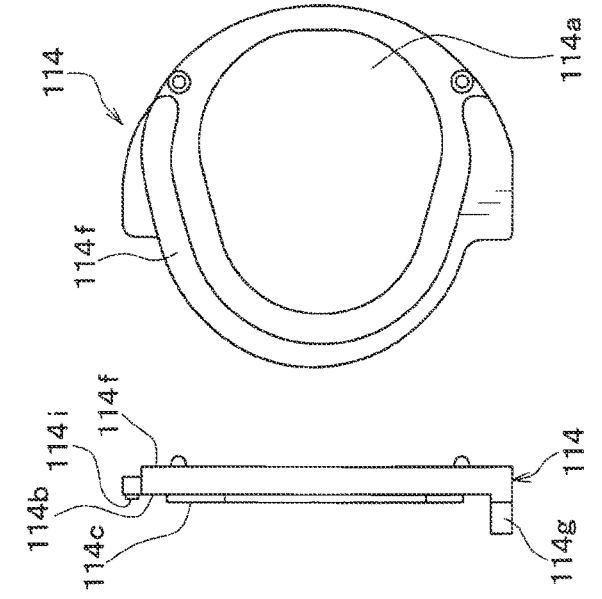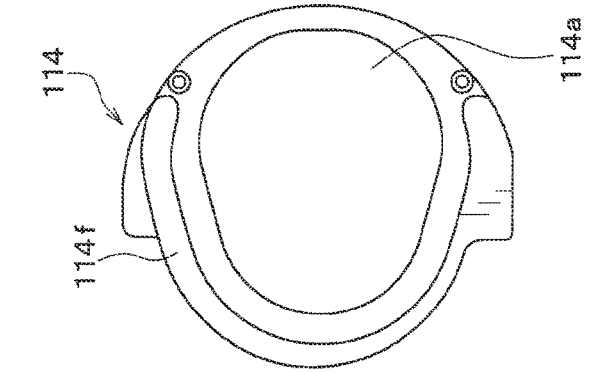

SEALING OF A GEAR PUMP

CROSS REFERENCE TO RELATED DOCUMENT

The present application claims the benefit of priority of Japanese Patent Application No. 2014-143263 filed on Jul. 11, 2014, No. 2015-11607 filed on Jan. 23, 2015, and No. 2015-11608 filed on Jan. 23, 2015, disclosures of which are incorporated herein by reference.

BACKGROUND

1. Technical Field

This disclosure relates generally to a gear pump apparatus, such as a trochoid pump, which is designed to use the meshing of gears to pump fluid by displacement and may be employed with automotive brake systems.

2. Background Art

Japanese Patent First Publication No. 2014-25352 discloses the above type of gear pump apparatus which includes, as illustrated in FIG. 18, a gear pump 19 equipped with an outer rotor 19a, an inner rotor 19b, and a sealing mechanism 111. The sealing mechanism 111 works to hermetically seal between a high-pressure region and a low-pressure region near one of ends of the gear pump 19.

The sealing mechanism 111 includes a hollow frame-shaped inner member 112, an annular rubber member 113, and a hollow frame-shaped outer member 114. The annular rubber member 113 is disposed between an outside peripheral wall of the inner member 112 and an inside peripheral wall of the outer member 114. The inner member 112 is fit in the outer member 114.

The outer member 114 is made of a plate which has a recess 114b and a protrusion 114c formed in and on one of end surfaces which faces the gear pump 19. The protrusion 114c is in contact with the end surface of the gear pump 19.

The parts of the sealing mechanism 111 are urged or biased by the discharge pressure of the gear pump 19 in a given direction. Specifically, the inner member 112 is disposed in abutment with a bottom surface of a recess formed in a housing (not shown), while the protrusion 114c of the outer member 114 is placed in contact abutment with the end surface of the gear pump 19. This creates a hermetical seal.

The exertion of the discharge pressure on the outside peripheral surface of the outer member 114 results in deformation of the outer member 114, which will develop mechanical pressure F' to grip the inner member 112 (which will also be referred to a gripping force below). If a coefficient of friction between the outer member 114 and the inner member 112 is expressed as a friction coefficient μ', frictional force F4 created between the inner member 112 and the outer member 114 in FIG. 18 will be F4=μ'·F'.

The outer member 114 is, as illustrated in FIG. 18, urged by the pressing force F1 against the gear pump 19. More specifically, the discharge pressure is exerted on an entire area of one of the end surfaces of the outer member 114 (i.e., the left end surface of the outer member 114, as viewed in FIG. 18) which is father away from the gear pump 19, so that the outer member 114 is uniformly pressed against the gear pump 19 as a whole.

The outer member 114 is also biased by the frictional force F4 away from the gear pump 19 (i.e., in a direction opposite the pressing force F1). The frictional force F4 is exerted on an inner periphery of the outer member 114.

The outer member 114 is, as described above, pressed uniformly to the gear pump 19. Simultaneously, the frictional force F4 acts on the inner periphery of the outer member 114 in the direction opposite the pressing force F1, thus causing the outer member 114 to be deformed to have an outer peripheral portion thereof closer to the gear pump 19 than an inner peripheral portion is.

More specifically, the outer member 114 is deformed or rotated about a contact between an outer peripheral edge of the protrusion 114c of the outer member 114 and the outer rotor 19a, so that the inner peripheral portion is moved away from the gear pump 19, while the outer peripheral portion is moved closer to the gear pump 19. This results in an increased pressure acting on the contact between the outer peripheral edge of the protrusion 114c of the outer member 114 and the outer rotor 19a, thus increasing the resistance to sliding motion of the outer rotor 19a which will require an increase in torque for driving the outer rotor 19a and the inner rotor 19b.

SUMMARY OF THE INVENTION

It is therefore an object of this disclosure to provide an improved structure of a gear pump apparatus which is designed to reduce the degree of torque required for a pumping operation thereof.

According to one aspect of the invention, there is provided a gear pumping apparatus which may be employed in a brake system for automotive vehicles. The gear pump apparatus comprises: (a) a gear pump which includes an outer gear and an inner gear meshing with the outer gear so as to define a plurality of cavities, the outer and inner gears being rotated through a drive shaft to suck and discharge fluid in a pumping operation; (b) a casing which has defined therein a chamber in which the gear pump is disposed; (c) a sealing mechanism which is disposed between an outer wall of the casing and the gear pump, the sealing mechanism working to create a hermetical seal between a low-pressure region and a high-pressure region, the low-pressure region including a suction side of the gear pump into which the fluid is sucked and a peripheral region of the drive shaft, the high-pressure region including a discharge side from which the fluid is discharged, the sealing mechanism including an annular rubber member, an outer member, and an inner member, the annular rubber member surrounding the low-pressure region to create a hermetical seal between the low-pressure region and the high-pressure region, the outer member being placed in contact with one of axially opposed ends of the casing and one of axially opposed ends of the gear pump, the inner member having an outer peripheral wall on which the annular rubber member is fit and being disposed inside the outer member, the inner member being arranged in contact with an inner surface of the outer wall of the casing, the inner surface facing an opposite side of the inner member to the gear pump; and (d) a contact member which is provided on one of the outer member and the casing and located outside a portion of the outer member which contacts the one of the axially opposed ends of the gear pump in a radial direction of the gear pump. The contact member is placed to create a physical contact between the outer member and the one of the axially opposed ends of the casing.

Specifically, the contact member works to bear or absorb a part of the pressing force by which the outer member is urged against the gear pump. This results in a decrease in pressure acting on an area of contact between the outer member and the gear pump, which leads to a drop in resistance to sliding between the gear pump and the outer member, thus decreasing a loss of torque required for the pumping operation of the gear pump.

According to the second aspect of the invention, there is provided a gear pump apparatus which may be employed in a brake system for automotive vehicles. The gear pump apparatus comprises: (a) a gear pump which includes an outer gear and an inner gear meshing with the outer gear so as to define a plurality of cavities, the outer and inner gears being rotated through a drive shaft to suck and discharge fluid in a pumping operation; (b) a casing which has defined therein a chamber in which the gear pump is disposed; and (c) a sealing mechanism which is disposed between an outer wall of the casing and the gear pump. The sealing mechanism works to create a hermetical seal between a low-pressure region and a high-pressure region. The low-pressure region includes a suction side of the gear pump into which the fluid is sucked and a peripheral region of the drive shaft. The high-pressure region includes a discharge side from which the fluid is discharged. The sealing mechanism includes an annular rubber member, an outer member, and an inner member. The annular rubber member surrounds the low-pressure region to create a hermetical seal between the low-pressure region and the high-pressure region. The outer member is placed in contact with one of axially opposed ends of the casing and one of axially opposed ends of the gear pump. The inner member has an outer peripheral wall on which the annular rubber member is fit and is disposed inside the outer member. The inner member is arranged in contact with an inner surface of the outer wall of the casing. The inner surface faces an opposite side of the inner member to the gear pump.

The outer member has formed on one of end surfaces thereof which faces the gear pump a protrusion placed in contact with one of the casing and the gear pump to define the low-pressure region and the high-pressure region. The outer member also has formed on the one of the end surfaces a recess placed out of contact with the casing and the gear pump.

The protrusion includes a first hermetically-sealing portion, a second hermetically-sealing portion, and a third hermetically-sealing portion. The first hermetically-sealing portion serves to close one of the cavities which is the largest in volume thereof. The second hermetically-sealing portion serves to close one of the cavities which is the smallest in volume thereof. The third hermetically-sealing portion is located between the first and second hermetically-sealing portions on a suction side of the gear pump.

At least one of the first and second hermetically-sealing portions also includes an extended area which extends toward the outer periphery of the gear pump outside an area whose outline which faces an outer periphery of the gear pump extends along a periphery of a region through which the cavities pass.

Specifically, the contact member works to bear or absorb a part of the pressing force by which the outer member is urged against the gear pump. This results in a decrease in pressure acting on an area of contact between the outer member and the gear pump, which leads to a drop in resistance to sliding between the gear pump and the outer member, thus decreasing a loss of torque required for the pumping operation of the gear pump.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5(a) is a front view which illustrates an outer member of a sealing mechanism installed in the gear pump apparatus of FIG. 1;

FIG. 5(b) is a side view of the outer member in FIG. 5(a);

FIG. 5(c) is a back view of the outer member in FIG. 5(a);

FIG. 5(d) is a sectional view, as taken along the line V-V in FIG. 5(a);

FIG. 5(e) is a side view of the outer member in FIG. 5(a);

FIG. 12(a) is a front view which illustrates an outer member of a sealing mechanism installed in a gear pump apparatus of the third embodiment;

FIG. 12(b) is a side view of the outer member in FIG. 12(a);

FIG. 12(c) is a back view of the outer member in FIG. 12(a);

FIG. 12(d) is a sectional view, as taken along the line XII-XII in FIG. 12(a);

FIG. 12(e) is a side view of the outer member in FIG. 12(a);

DESCRIPTION OF THE PREFERRED EMBODIMENTS

Figure 1:
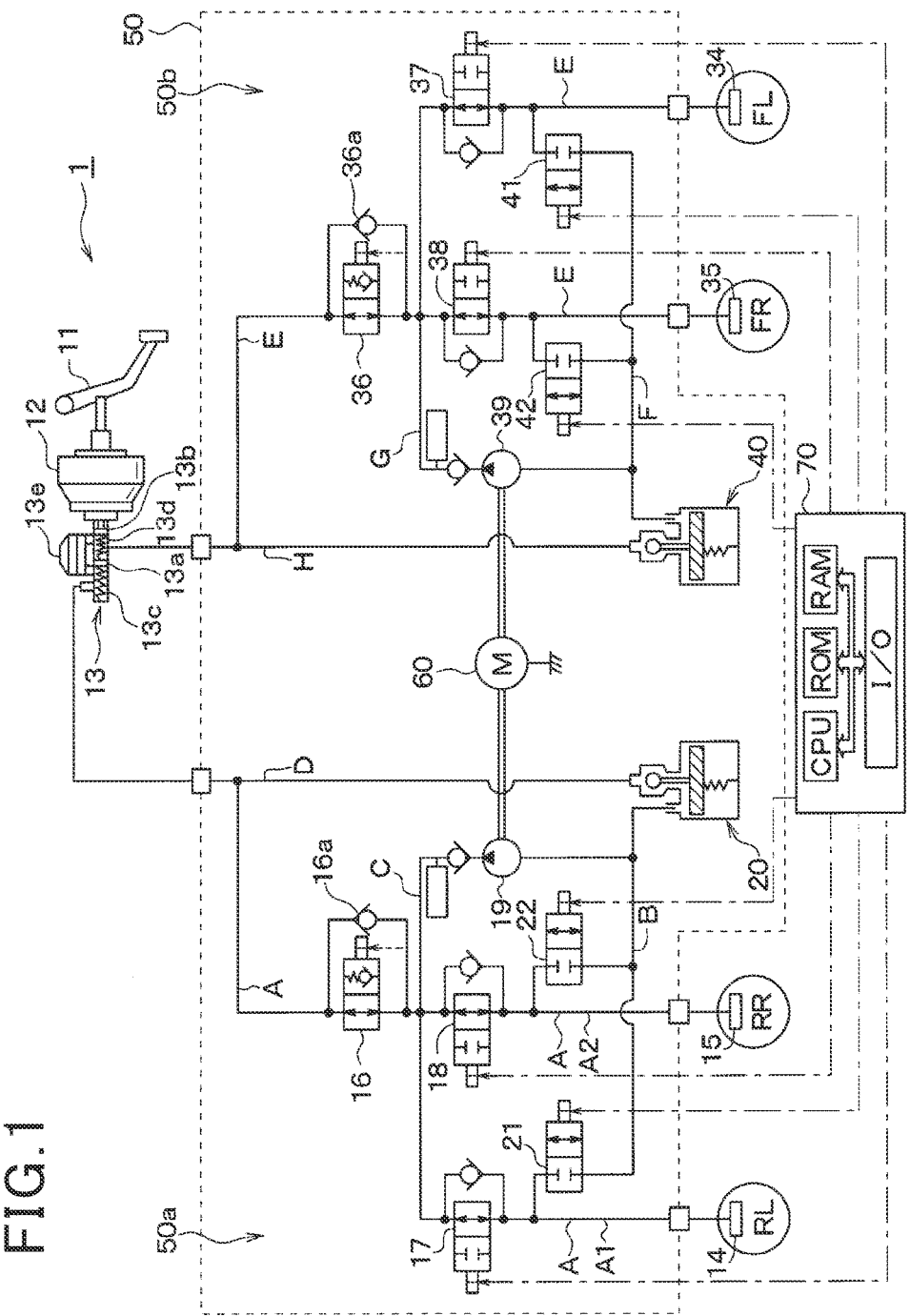
FIG. 1 is a circuit diagram which illustrates a brake system equipped with a gear pump apparatus according to the first embodiment of the invention.

Embodiments will be described below with reference to the drawings wherein like reference numbers refer to like or equivalent parts in several views. Referring to FIG. 1, there is shown an automotive brake system which, as referred to herein, is used with an automotive vehicle equipped with a front/rear split hydraulic system.

The brake system includes a brake device 1 which is equipped with a brake pedal 11 (i.e., a brake actuating member) to be depressed by a vehicle operator or driver for applying the brakes to the vehicle, a brake booster 12, a master cylinder 13, wheel cylinders 14, 15, 34, and 35, and a brake pressure control actuator 50. The master cylinder 13, as will be described later in detail, works to produce a braking hydraulic pressure in response to an operation of the brake actuating member (i.e., the brake pedal 11). The actuator 50 has a brake ECU (Electronic Control Unit) 70 installed therein. The brake ECU 70 works to control the braking force, as developed by the brake device 1.

The brake pedal 11 is connected to the brake booster 12 and the master cylinder 13. When the driver of the vehicle depresses the brake pedal 11, the brake booster 12 works to boost the pressure applied to the brake pedal 11 and push master pistons 13*a* and 13*b* installed in the master cylinder 13, thereby developing the same pressure (which will also be referred to as M/C pressure below) in a primary chamber 13*c* and a secondary chamber 13*d* which are defined by the master pistons 13*a* and 13*b*. The M/C pressure is then transmitted to the wheel cylinders 14, 15, 34, and 35 through the actuator 50 serving as a brake hydraulic pressure controller. The master cylinder 13 is equipped with a master reservoir 13*e* which has fluid paths communicating with the primary chamber 13*c* and the secondary chamber 13*d*, respectively.

The actuator 50 includes a first hydraulic circuit 50*a* and a second hydraulic circuit 50*b*. The first hydraulic circuit 50*a* is a rear hydraulic circuit working to control the brake fluid to be applied to the rear right wheel RR and the rear left wheel RL. The second hydraulic circuit 50*b* is a front hydraulic circuit working to control the brake fluid to be applied to the front left wheel FL and the front right wheel FR.

The first hydraulic circuit 50*a* is smaller in consumed amount of brake fluid (i.e., the capacity of a caliper) than the second hydraulic circuit 50*b*, but identical in structure. Therefore, for the brevity of disclosure, the following discussion will refer only to the first hydraulic circuit 50*a* below.

The first hydraulic circuit 50*a* is equipped with a main hydraulic line A (also called a main hydraulic path below) through which the M/C pressure is transmitted to the wheel cylinder 14 for the rear left RL and the wheel cylinder 15 for the rear right wheel RR to produce wheel cylinder pressures (which will also be referred to as W/C pressures below) which create the braking force.

The main hydraulic line A has disposed therein a differential pressure control valve 16 which is operable in either of two modes: an open mode and a pressure-difference mode. In a normal braking mode where it is required to produce the braking force as a function of an amount of depression of the brake pedal 11 by the driver, that is, a motion control mode is entered, the valve position of the differential pressure control valve 16 is placed in the open mode. The differential pressure control valve 16 is equipped with a solenoid coil. When the solenoid coil is energized electrically, the valve position of the differential pressure control valve 16 is moved and placed in the pressure-difference mode. Specifically, when the current supplied to the solenoid coil is increased, it sets the differential pressure control valve 16 to the pressure-difference mode.

When entering the pressure-difference mode, the differential pressure control valve 16 works to control the flow of the braking fluid to elevate the W/C pressures in the wheel cylinders 14 and 15 above the M/C pressure. When the W/C pressures in the wheel cylinders 14 and 15 become higher than the M/C pressure by a set pressure difference, as developed by the differential pressure control valve 16, it permits the brake fluid to flow from the wheel cylinders 14 and 15 to the master cylinder 13. Usually, the W/C pressures in the wheel cylinders 14 and 15 are held from elevating above the M/C pressure by more than the set pressure difference.

The main hydraulic line A is equipped with two branch lines: a hydraulic line A1 and a hydraulic line A2 which extend downstream of the differential pressure control valve 16 to the wheel cylinders 14 and 15, respectively. The hydraulic line A1 is equipped with a first pressure-increasing valve 17 to increase the pressure of the brake fluid supplied to the wheel cylinder 14. Similarly, the hydraulic line A2 is equipped with a second pressure-increasing valve 18 to increase the pressure of the brake fluid supplied to the wheel cylinder 15.

Each of the first and second pressure-increasing valves 17 and 18 is implemented by a normally-open two-position valve which is opened or closed by the brake ECU 70 to control increasing of the braking hydraulic pressure (i.e., the pressure of the brake fluid applied to the wheel cylinder 14 or 15). Specifically, when a solenoid coil installed in the first pressure-increasing valve 17 is deenergized, the first pressure-increasing valve 17 is opened. Alternatively, the solenoid coil is energized, the first pressure-increasing valve 17 is closed. The same is true for the second pressure-increasing valve 18.

The actuator 50 also includes a hydraulic line B which extends as a pressure-reducing path between a junction of the pressure-increasing valve 17 and the wheel cylinder 14 and a pressure control reservoir 20 and between a junction of the pressure-increasing valve 18 and the wheel cylinder 15 and the pressure control reservoir 20. The hydraulic line B has installed therein first and second pressure-reducing valves 21 and 22 which are each implemented by a normally closed two-position solenoid valve to control decreasing of the braking hydraulic pressure (i.e., the pressure of the brake fluid applied to the wheel cylinder 14 or 15).

The actuator 50 also includes a hydraulic line C which extends as a recirculating path between the pressure control reservoir 20 and the hydraulic line A. The hydraulic line C is equipped with a self-priming gear pump 19 which is driven by an electric motor 60 to suck the brake fluid from the pressure control reservoir 20 and feed it to the master cylinder 13 or the wheel cylinders 14 and 15. The electric motor 60 is driven by controlling the energization of a motor relay (not shown).

The actuator 50 also includes a hydraulic line D which extends as a sub-hydraulic line between the pressure control reservoir 20 and the master cylinder 13. In the motion control mode, the gear pump 19 works to suck the brake fluid from the master cylinder 13 through the hydraulic line D and output it to a required one of the wheel cylinders 14 and 15 through the hydraulic line A to increase the W/C pressure of a target one of the wheels.

The second hydraulic circuit 50*b* is, as already described, substantially identical in structure with the first hydraulic circuit 50*a*. Specifically, the second hydraulic circuit 50*b* is equipped with a differential pressure control valve 36, third and fourth pressure-increasing valves 37 and 38, third and fourth pressure-reducing valves 41 and 42, a pressure control reservoir 40, and a gear pump 39. The differential pressure control valve 36 corresponds to the differential pressure control valve 16. The third and fourth pressure-increasing valves 37 and 38 correspond to the first and second pressure-increasing valves 17 and 18. The third and fourth pressure-reducing valves 41 and 42 correspond to the first and second pressure-reducing valves 21 and 22. The pressure control reservoir 40 corresponds to the pressure control reservoir 20. The gear pump 39 corresponds to the gear pump 19. The second hydraulic circuit 50*b* also includes hydraulic lines E, F, G, and H which correspond to the hydraulic lines A, B, C, and D. The second hydraulic circuit 50*b* serving as the front hydraulic circuit, as described above, has a hydraulic capacity to supply the brake fluid to the wheel cylinders 35 and 34 which is greater than that of the first hydraulic circuit 50*a* to supply the brake fluid to the wheel cylinders 14 and 15, so that the braking force for the front wheels will be greater in magnitude than that for the rear wheels.

The brake ECU 70 serves as a controller for the brake device 1 and is implemented by a typical microcomputer made up of a CPU, a ROM, a RAM, an I/O device, etc. The brake ECU 70 executes various operations, as instructed by programs stored in the ROM, to control the motion of the vehicle in the motion control mode such as an anti-lock brake control mode or an electronic stability control mode. Specifically, the brake ECU 70 calculates physical quantities, as indicated by outputs of sensors (not shown), and determines whether the motion control mode should be performed or not using the calculated physical quantities. When it is required to perform the motion control mode, the brake ECU 70 calculates a controlled variable for a target one of the wheels, that is, a target W/C pressure to be developed in a corresponding one of the wheel cylinders 14, 15, 35, or 34 and then controls the operations of the valves 16 to 18, 21, 22, 36 to 38, 41, and 42 and the operation of the motor 60 which drives the gear pumps 19 and 39 to achieve the target W/C pressure.

When the master cylinder 13 produces no pressure, for example, in the traction control mode or the electronic stability control mode, the brake ECU 70 activates the gear pump 19 and 39 and places the first and second differential pressure control valves 16 and 36 in the pressure difference mode, thereby supplying the brake fluid downstream of the differential pressure control valves 16 and 36, that is, to the wheel cylinders 14, 15, 34, and 35 through the hydraulic lines D and H. The brake ECU 70 then selectively controls the operations of the first to fourth pressure-increasing valves 17, 18, 37, and 38 or the first to fourth pressure-reducing valves 21, 22, 41, and 42 to increase or decrease the W/C pressure in a target one(s) of the wheel cylinders 14, 15, 34, and 35 into agreement with a target value.

When the anti-lock brake control mode is entered, that is, the anti-lock brake system (ABS) is activated, the brake ECU 70 increases or decreases the pressure of the brake fluid applied to the wheel cylinders 14, 15, 34, and 35 to avoid skidding of the wheels FR, FL, RL, and RR. Specifically, the brake ECU 70 selectively controls the operations of the first to fourth pressure-increasing valves 17, 18, 37, and 38 or the first to fourth pressure-reducing valves 21, 22, 41, and 42 to increase or decrease the W/C pressure in a target one(s) of the wheel cylinders 14, 15, 34, and 35 into agreement with a target value.

Figure 2:
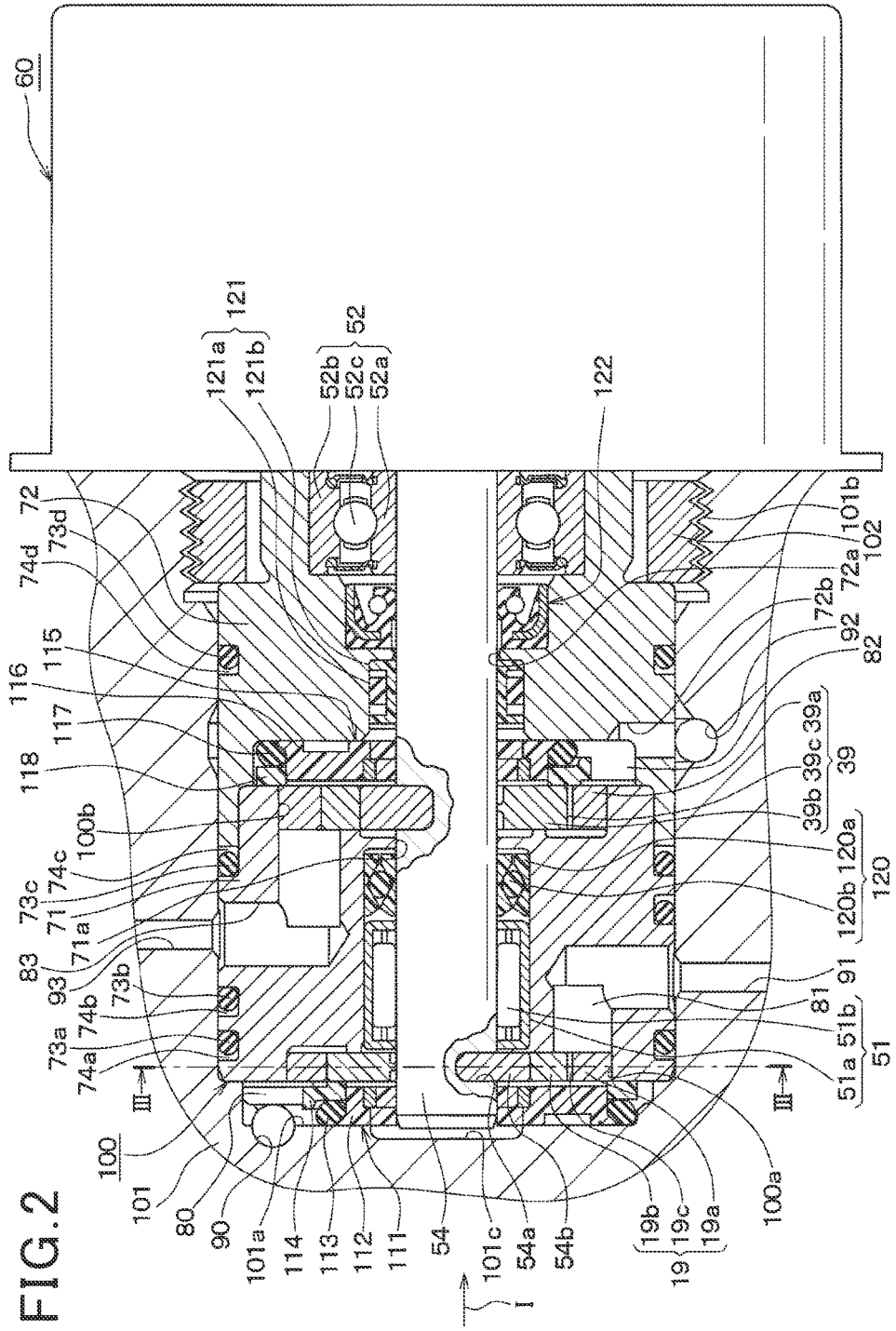
FIG. 2 is a partially sectional view which illustrates a pump body of the gear pump apparatus secured to a housing of an actuator.
Figure 3:
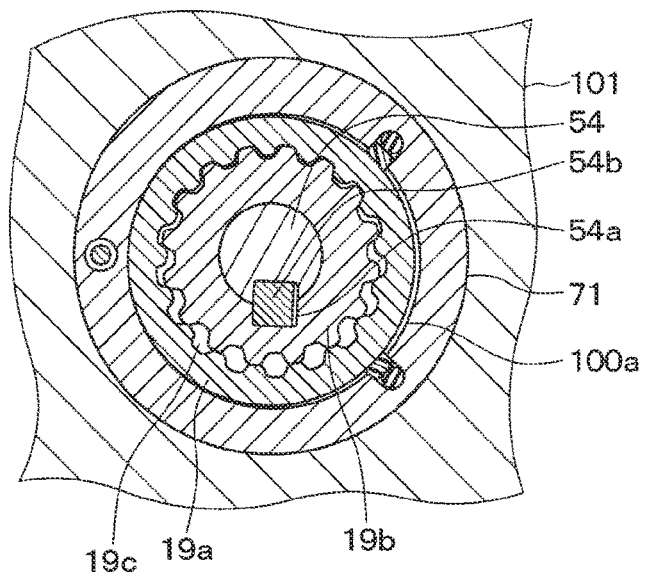
FIG. 3 is a traverse sectional view, as taken along the line III-III in FIG. 2.

The structure of the gear pump apparatus, that is, the structure of the gear pumps 19 and 39 installed in the brake device 1 will be described below with reference to FIGS. 2 and 3. FIG. 2 is a partially sectional view which illustrates a pump body 100 of the gear pump apparatus secured to a housing 101 of the actuator 50 working to control the pressure of the brake fluid. The vertical direction in the drawing is the vertical direction of the vehicle.

The automotive brake system is, as described above, equipped with two hydraulic systems: the first hydraulic circuit 50*a* and the second hydraulic circuit 50*b* and thus has the pump body 100 made up of the gear pump 19 for the first hydraulic circuit 50*a* and the gear pump 39 for the second hydraulic circuit 50*b*.

The gear pumps 19 and 39 installed in the pump body 100 are driven by rotation of a drive shaft (i.e., an output shaft) 54 of the motor 60. The drive shaft 54 is retained by a first bearing 51 and a second bearing 52. A casing which will also be referred to as a pump casing below and serves as an outer shell or housing of the pump body 100 is made up of an aluminum cylinder 71 and an aluminum plug 72. The first bearing 51 is disposed in the cylinder 71. The second bearing 52 is disposed in the plug 72.

The cylinder 71 and the plug 72 are placed coaxially. The cylinder 71 has an end portion press-fit in the plug 72 to form a shell or casing of the pump body 100. The pump body 100 is made up of the cylinder 71, the plug 72, the gear pumps 19 and 39, and sealing mechanisms, as will be described later.

The pump body 100 is assembled in the way, as described above, and fitted from the right side of the drawing into a substantially cylindrical mount chamber 101*a* formed in the aluminum-made housing 101 of the actuator 50. The mount chamber 101*a* has an internal thread 101*b* formed in an inner end wall thereof. An annular screw 102 which has an external thread is fastened into engagement with the internal thread 101*b* to retain the pump body 100 in the housing 101 firmly. The screw 102 serves to hold the pump body 100 from being detached from the housing 101. The housing 101 will also be referred to as a casing below.

The direction in which the pump body 100 is fitted into the mount chamber 101*a* of the housing 101 will also be referred to as an insertion direction below. The axial, circumferential, and radial directions of the pump 100 (i.e., the drive shaft 54 of the motor 60) will be generally referred to as a pump axial direction, a pump circumferential direction, and a pump radial direction below.

The housing 101 also has a cylindrical center chamber 101*c* formed in a central portion of the bottom of the mount chamber 101*a* which is aligned with the drive shaft 54 of the motor 60. In other words, the center chamber 101*c* is located coaxially with the drive shaft 54. The center chamber 101*c* will also be referred to as a second chamber below. The second chamber 101*c* is greater in diameter than the drive shaft 54. The drive shaft 54 has a head disposed inside the second chamber 101c and is placed in non-contact with the housing 101.

The cylinder 71 and the plug 72 have formed therein center holes 71a and 72a into which the drive shaft 54 is inserted. The drive shaft 54 is retained to be rotatable by the first bearing 51 and the second bearing 52 which are mounted in the center hole 71a of the cylinder 71 and the center hole 72a of the plug 72. The first and second bearings 51 and 52 may be of any structure, but are implemented by a ball bearing in this embodiment.

Specifically, the first bearing 51 is made of a needle bearing with no inner race and equipped with an outer race 51a and needle rollers 51b. The drive shaft 54 is fit in a hole of the first bearing 51 to be retained rotatably. The cylinder 71 has a bearing chamber in a front portion of the center hole 71a, that is, formed in front of the insertion direction within the center hole 71a. The bearing chamber a relatively great diameter. The first bearing 51 is press-fit in the bearing chamber.

The second bearing 52 is made up of an inner race 52a, an outer race 52b, and rollers (e.g., balls) 52c. The outer race 52b is press-fit in the center hole 72a of the plug 72 to retain the second bearing 52 firmly inside the plug 72. The drive shaft 54 is also fit in the inner race 52a to be rotatable.

The gear pumps 19 and 39 are arranged on opposite sides of the first bearing 51. Specifically, the gear pump 19 is disposed in front of the first bearing 51 in the insertion direction. The gear pump 39 is disposed between the first and second bearings 51 and 52.

The gear pump 19 is mounted within a rotor chamber 100a which is defined by a cylindrical counterbore formed in the front end (i.e., the left end, as viewed in the drawing) of the cylinder 71. The gear pump 19 is implemented by an internal gear trochoid pump which is driven by the drive shaft 54 of the motor 60 which extends into the rotor chamber 100a.

Specifically, the gear pump 19 is equipped with a rotating assembly made up of an outer rotor 19a and an inner rotor 19b. The drive shaft 54 is fit in a center hole of the inner rotor 19b. A key 54b is fit in a hole 54a formed in the drive shaft 54 and works to transmit torque of the drive shaft 54 to the inner rotor 19b.

The outer rotor 19a has internal teeth formed on an inner periphery thereof. The inner rotor 19b has external teeth formed on an outer periphery thereof. The internal teeth of the outer rotor 19a mesh with the external teeth of the inner rotor 19b so as to create a plurality of gaps or enclosed cavities 19c therebetween. The cavities 19c are changed in volume thereof with rotation of the drive shaft 54, thereby sucking or discharging the brake fluid.

The gear pump 39 is, like the gear pump 19, disposed in a rotor chamber 100b which is defined by a cylindrical counterbore formed in the rear end (i.e., the right end, as viewed in the drawing) of the cylinder 71. The gear pump 39 is also driven by the drive shaft 54 passing through the rotor chamber 100b. The gear pump 39 is implemented by an internal gear pump and, like the gear pump 19, includes a rotating assembly made up of an outer rotor 39a and an inner rotor 39b. The outer rotor 39a has internal teeth formed on an inner periphery thereof. The inner rotor 39b has external teeth formed on an outer periphery thereof. The internal teeth of the outer rotor 39a mesh with the external teeth of the inner rotor 39b so as to create a plurality of gaps or enclosed cavities 39c therebetween. The cavities 39c are changed in volume thereof with rotation of the drive shaft 54, thereby sucking or discharging the brake fluid. The gear pump 39 is located at an angular position which is 180° away from the gear pump 19 around the axis of the drive shaft 54. In other words, the layout of the cavities 39c is diametrically opposed to, that is, symmetrical with that of the cavities 19c of the gear pump 19 about the axis of the drive shaft 54. This cancels high pressures of the brake fluid against each other which are developed at outlets of the gear pumps 19 and 39 and adversely exerted on the drive shaft 54.

The gear pumps 19 and 39 are substantially identical in structure with each other, but have thicknesses different from each other in the pump axial direction. Specifically, the gear pump 39 which is mounted in the second hydraulic circuit 50b (i.e., the front hydraulic circuit) is greater in thickness than the gear pump 19 which is mounted in the first hydraulic circuit 50a (i.e., the rear hydraulic circuit). More specifically, the rotors 39a and 39b of the gear pump 39 are greater in thickness thereof than the rotors 19a and 19b of the gear pump 19 in the pump axial direction. This causes the gear pump 39 to be greater in suction or discharge rate of the brake fluid than the gear pump 19, thus enabling a greater volume of the brake fluid to be delivered to the front hydraulic circuit than to the rear hydraulic circuit.

The housing 101, as clearly illustrated in FIG. 2, has a sealing mechanism 111 installed therein. Specifically, the sealing mechanism 111 is disposed outside the front end of the cylinder 71 (i.e., the gear pump 19) and works to press the gear pump 19 against the cylinder 71. The plug 72 has a sealing mechanism 115 installed behind the cylinder 71, that is, at the rear side (i.e., the right side, as viewed in the drawing) of the cylinder 71 (i.e., the gear pump 39). The sealing mechanism 115 works to press the gear pump 39 against the cylinder 71.

The sealing mechanism 111 is disposed between the bottom (i.e., an outer shell or outer wall of the housing 101) of the mount chamber 101a of the housing 101 and the gear pump 19. The sealing mechanism 111 is of an annular shape and has the top end of the drive shaft 54 fit therein and urges the outer rotor 19a and the inner rotor 19b of the gear pump 19 against the end of the cylinder 71 to create a hermetical seal or hermetically isolate between a lower-pressure portion and a higher-pressure portion of one of the ends of the gear pump 19. Specifically, the sealing mechanism 111 is placed in contact with the bottom (i.e., the outer shell or outer wall of the housing 101) of the mount chamber 101a of the housing 101 and selected portions of the outer rotor 19a and the inner rotor 19b, thereby developing the hermetical seal.

The sealing mechanism 111 is made up of a hollow frame-like inner member 112, an annular rubber member 113, and a hollow frame-like outer member 114. The inner member 112 is fit in the outer member 114 with the annular rubber member 113 being placed between the outer peripheral wall of the inner member 112 and the inner peripheral wall of the outer member 114.

Figure 4A:
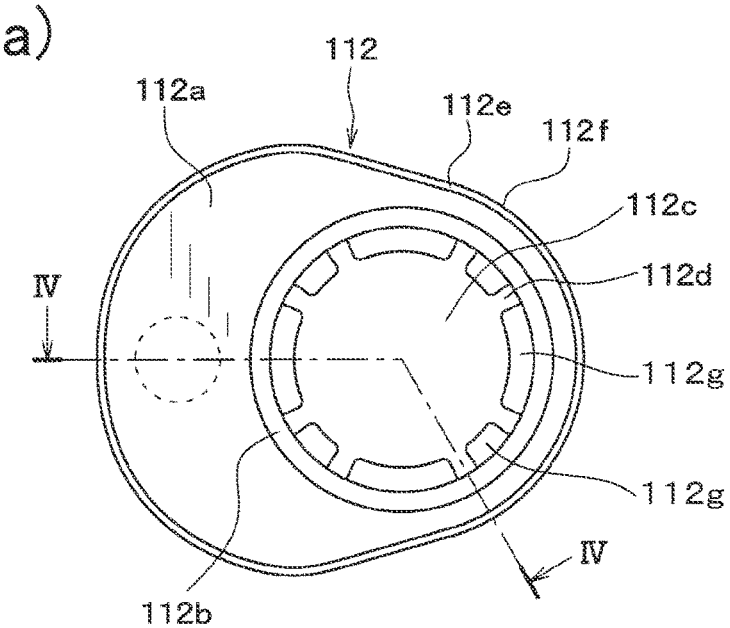
FIG. 4(a) is a front view which illustrates an inner member of a sealing mechanism installed in the gear pump apparatus of FIG. 1.
Figure 4B:
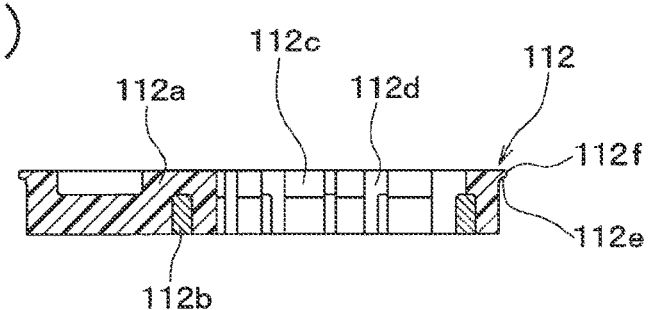
FIG. 4(b) is a sectional view, as taken along the line IV-IV in FIG. 4(a)

The inner member 112 and the outer member 114 of the sealing mechanism 111 will be described below in detail with reference to FIGS. 4(a), 4(b), and 5(a) to 5(d). FIG. 4(a) is a front view of the inner member 112. FIG. 4(b) is a sectional view, as taken along the line IV-IV in FIG. 4(a), which represents the same cross section as that of the sealing mechanism 111 in FIG. 2.

FIG. 5(a) is a front view of the outer member 114. FIG. 5(b) is a right side view of the outer member 114. FIG. 5(c) is a back view of the outer member 114. FIG. 5(d) is a sectional view, as taken along the line V-V of FIG. 5(a). FIG. 5(e) is a left side view of the outer member 114.

The inner member 112 is, as can be seen in FIGS. 4(a) and 4(b), made up of a resinous portion 112a and a metallic ring 112b. The inner member 112 is formed by insert-molding techniques. Specifically, the metallic ring 112b is placed in a mold as an insert to form the resinous portion 112a.

The resinous portion 112a is of a hollow disc with a hole 112c in which the drive shaft 54 is disposed. The hole 112c may be of a circular shape just contoured to conform with the shape of a traverse section of the drive shaft 54, but in this embodiment is actually shaped with a plurality of slits 112d extending in the pump axial direction to be partially greater in diameter than the drive shaft 54 (i.e., greater in diameter at the slit locations). The metallic ring 112b is located coaxially with the hole 112c and serves as a reinforcement to increase the mechanical strength of, especially, a section of the resinous portion 112a around the hole 112c.

The resinous portion 112a includes a plurality of tabs 112g defined by the slits 112d. Specifically, each of the slits 112d is formed between adjacent two of the tabs 112g. Each of the tabs 112g extends inwardly inside the metallic ring 112b in a radial direction of the hole 112c. Each of the slits 112d extends outwardly to the location of the metallic ring 112b. The distance between the inner end of each of the tabs 112g and the center of the hole 112c is identical with the radius of the drive shaft 54.

The drive shaft 54 is in slidable contact with the inner ends of the tabs 112g. In other words, the inner ends of the tabs 112g will be a surface of the resinous portion 112a on which the drive shaft 54 slides. The tabs 112g, therefore, hold the metallic ring 112b from contacting with the circumference of the drive shaft 54. If the metallic ring 112b is designed to have an inner surface defining the surface of the inner wall of the hole 112c with which the drive shaft 54 rotates in contact, it makes it possible to use the metallic ring 112b for regulating an air gap between the outer peripheral surface of the drive shaft 54 and the inner peripheral surface of the hole 112c in order to position the drive shaft 54 in the pump radial direction. The drive shaft 54 is, however, placed in direct contact with the inner circumference of the metallic ring 112b, thus requiring the drive shaft 54 and the metallic ring 112b to be made from different materials in order to avoid the mechanical seizure of the drive shaft 54 due to the sliding thereof with the metallic ring 112b. For instance, the drive shaft 54 is made from SUS (i.e., stainless steel), while the metallic ring 112b is made from copper. The copper is usually softer than SUS, thus requiring the metallic ring 112b to have an increased thickness in order to serve as a reinforcement for the resinous portion 112a. In order to alleviate this drawback, the resinous portion 112a is shaped to have the inner surface which slidably contacts with the drive shaft 54 in order to keep the metallic ring 112b away from the drive shaft 54. This eliminates the limitation to the use of materials of the drive shaft 54 and the metallic ring 112b. The drive shaft 54 and the metallic ring 112b may, therefore, be made from the same material. For instance, the use of a relatively hard material such as SUS in making the metallic ring 112b permits the thickness of the metallic ring 112b to be decreased as compared with the use of a relatively soft material such as copper and also results in a decrease in production cost of the metallic ring 112b.

The inner member 112 is, as can be seen from FIG. 4(a), oval and includes two curved sections: a smaller curvature section (i.e., the right side, as viewed in the drawing, that is, a high-pressure discharge side of the gear pump 19) and a greater curvature section (i.e., the left side, as viewed in the drawing, that is, a low-pressure suction side of the gear pump 19). The smaller curvature section is smaller in radius of curvature than an inscribed circle passing through all bases (or bottoms) of the cavities 19c, in other words, smaller than the outer periphery of the inner rotor 19b. The greater curvature section is greater in radius of curvature than a circumscribed circle passing through all vertices of the cavities 19c. With this geometry of the inner member 112, when the annular rubber member 113 is fit on the outer periphery of the inner member 112, an area around the drive shaft 54 and the suction side of the gear pump 19 which are lower in pressure level are located inside the annular rubber member 113, while the discharge side of the gear pump 19 which is higher in pressure level is located outside the annular rubber member 113.

When the gear pump 19 is in a pumping operation, the high-pressure of the brake fluid, pumped out of the gear pump 19, will be applied to the annular rubber member 113, so that the annular rubber member 113 is elastically deformed or compressed inwardly in the pump radial direction against the outer peripheral wall of the inner member 112. The outer peripheral wall of the inner member 112, thus, has a surface (which will also be referred to as a pressure-exerted surface below) on which the pressure is exerted inwardly through the deformation of the annular rubber member 113. The pressure-exerted surface of the inner member 112 is, as can be seen in FIGS. 2 and 4(b), shaped to have an annular slant area 112e which extends obliquely outward from a major part of the outer periphery of the inner member 112, thereby thrusting the inner member 112 away from the gear pump 19 in the pump axial direction. Specifically, the inner member 112 has an annular flange 112f formed on a front corner farther away from the gear pump 19. The flange 112f has the slant area 112e and extends fully in the circumferential direction of the inner member 112 and has the slant area 112e facing the gear pump 19.

The annular rubber member 113 is implemented by an O-ring and fit on the outer periphery of the inner member 112. In other words, the annular rubber member 113 is interposed between the inner member 112 and the outer member 114. The annular rubber member 113 functions to increase the pressure, as exerted by the above described compression thereof on the pressure-exerted surface of the inner member 112, with a rise in hydraulic pressure discharged from the gear pump 19 (i.e., the discharge pressure of the gear pump 19) during the pumping operation thereof. The annular rubber member 113 is also placed in contact abutment with the bottom of the mount chamber 101a to hermetically seal between the discharge side of the gear pump 19 including the discharge chamber 80 (i.e., a high-pressure region within the gear pump 19) and a low-pressure region within the gear pump 19 including a peripheral region around the drive shaft 54 and the suction side of the gear pump 19. The annular rubber member 113 may be contoured to conform with the outer periphery of the inner member 112, but may alternatively be shaped to be circular which is permitted to be elastically deformed and fit on the outer periphery of the inner member 112.

The outer member 114 is, as described above, placed on one of the ends of the gear pump 19 and functions to hermetically seal between the lower-pressure side (i.e., the low-pressure region) and the higher-pressure side (i.e., the high-pressure region) of the gear pump 19. The outer member 114 is, as clearly illustrated in FIGS. 5(a) and 5(c), of a hollow frame-like shape and has a center hole 114a whose outline is contoured to conform with the outer periphery of the inner member 112. The outer member 114 is formed by an annular plate and has one of opposed ends which is stepwise. Specifically, the outer member 114 has a recess (i.e., a concave portion) 114b and a protrusion (i.e., a convex portion) 114c formed on one of the ends thereof which faces the gear pump 19. The protrusion 114c is placed in contact with end surfaces of the rotors 19a and 19b and the cylinder 71.

The protrusion 114c has formed thereon three hermetically-sealing portions: the first hermetically-sealing portion 114d, the second hermetically-sealing portion 114e, and the third hermetically-sealing portion 114h. The first hermetically-sealing portion 114d has a width which is great enough to fully close one of the cavities 19c which is located between the inlet port 81 and the discharge chamber 80, as will be described later in detail. Similarly, the second hermetically-sealing portion 114e has a width which is great enough to fully close one of the cavities 19c which is diametrically opposed to the one of the cavities 19c closed by the first hermetically-sealing portion 114d and located between the inlet port 81 and the discharge chamber 80. In other words, the first hermetically-sealing portion 114d is located to fully close one of the cavities 19c which is the largest in volume thereof, while the second hermetically-sealing portion 114e is located to fully close one of the cavities 19c which is the smallest in volume thereof. The first and second hermetically-sealing portions 114d and 114e are placed in contact with the end surfaces of the rotors 19a and 19b to seal the cavities 19c and also hermetically seal or isolate between the high-pressure region and the low-pressure region within the gear pump 19.

The third hermetically-sealing portion 114h is located between the first and second hermetically-sealing portions 114h and 114d and placed in contact with the end surface of the cylinder 71 to hermetically isolate between the high-pressure region and the low-pressure region within the gear pump 19.

The recess 114b hydraulically communicates with the discharge chamber 80 so that is subjected to the high discharge pressure. Therefore, when the gear pump 19 is discharging the brake fluid at high pressure, it will cause the high pressure of the brake fluid to act on the recess 114b and the outer periphery of the outer member 114, thereby resulting in elastic deformation of the outer member 114 to grip the inner member 112 firmly.

The inner member 112 and the annular rubber member 113 are attached to the outer member 114 from the opposite side to the gear pump 19. The outer member 114 has an arc-shaped wall 114f protruding from on one of the end surfaces thereof which is farther away from the gear pump 19. The arc-shaped wall 114f is contoured to conform with the configuration of a portion of the annular rubber member 113. The annular rubber member 113 is disposed in contact with an inner side wall of the arc-shaped wall 114f, thereby ensuring the positioning of the outer member 114, the inner member 112, and the annular rubber member 113 accurately.

The outer member 112 has a rotation stopper 114g formed in the shape of a protrusion on the end surface thereof facing the gear pump 19. The rotation stopper 114g is located outside the protrusion 114c in the pump radial direction. The rotation stopper 114g is fit in a recess or bore (not shown) formed in the cylinder 71 to stop the outer member 112 from rotating.

Figure 6:
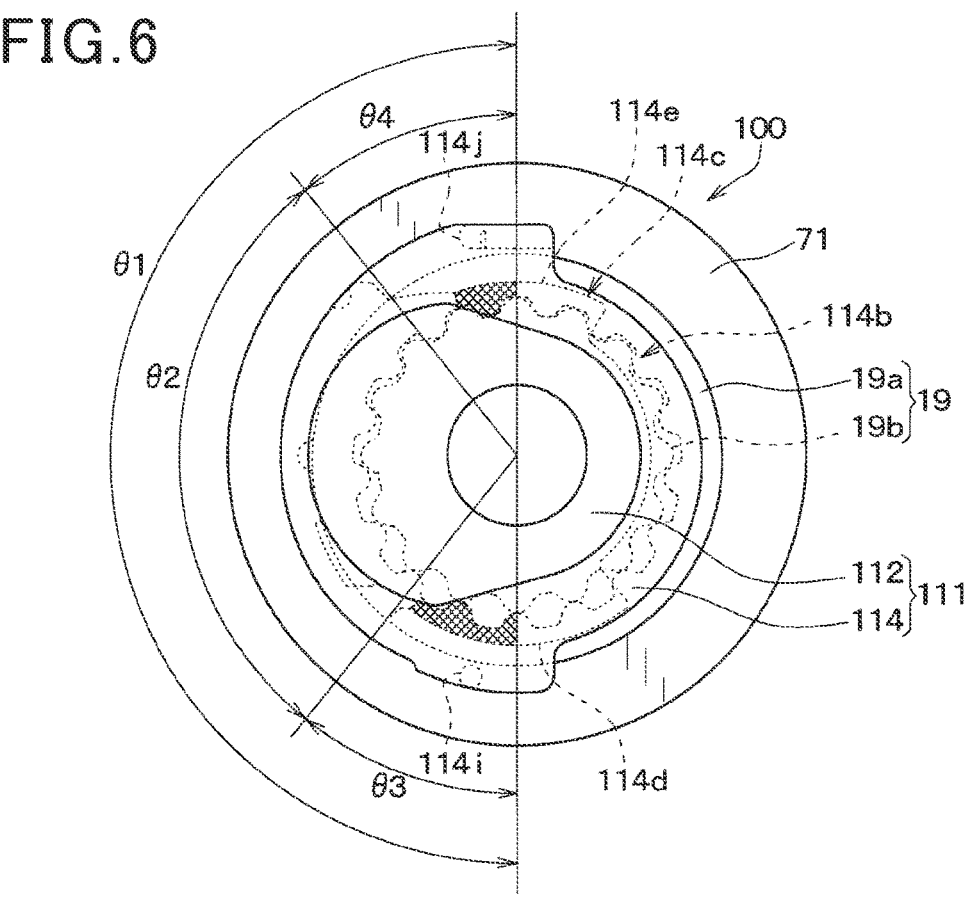
FIG. 6 is an illustration which shows a pump body, as viewed in a direction, as indicated by an arrow I in FIG. 2.

In the following discussion, an angle through which the gear pump 19 rotates to suck the brake fluid in the pumping operation, as illustrated in FIG. 6, will be referred to as a suction rotational range $\theta 1$ below. A portion of the suction rotational range $\theta 1$ which is occupied by the third hermetically-sealing portion 114h placed in contact with the end surface of the cylinder 71 will be referred to as a non-sliding range $\theta 2$ below.

A portion of the suction rotational range $\theta 1$ which is occupied by the first hermetically-sealing portion 114d placed in contact with the end surface of the cylinder 71 will be referred to as a first sliding range $\theta 3$ below. Specifically, the first sliding range $\theta 3$ is a range where the first hermetically-sealing portion 114d and the third hermetically-sealing portion 114h do not overlap each other in the pump radial direction.

The outer member 114, as clearly illustrated in FIGS. 5 and 6, includes a first contact 114i formed on the recess 114b. The first contact 114i is located outside the first hermetically-sealing portion 114d in the pump radial direction within the first sliding range $\theta 3$. The outer member 114 also includes a second contact 114j formed on the recess 114b. The second contact 114j is located outside the second hermetically-sealing portion 114e in the pump radial direction within the second sliding range $\theta 4$. Each of the first and second contacts 114i and 114j works as a mechanical support and is defined by a protrusion formed on the recess 114b to have a top end standing outside the first and second hermetically-sealing portion 114d and 114e in the pump axial direction. The first and second contacts 114i and 114j will also be referred to as first and second contact members below.

The sealing mechanism 111 has a radius that is a distance between the outer periphery thereof and the center of the drive shaft 54 at least in an upper portion of the cross section of the sealing mechanism 111, as viewed in FIG. 2, and smaller than the radius of the mount chamber 101a of the housing 101, thereby creating an air gap between the upper portion of the sealing mechanism 111, as viewed in FIG. 2, and the mount chamber 101a of the housing 101 through which the brake fluid flows. The air gap defines the discharge chamber 80 which hydraulically connects with an outlet path 90 formed in the bottom of the mount chamber 101a of the housing 101. The gear pump 19 works to output the brake fluid through a hydraulic outlet circuit defined by the discharge chamber 80 and the outlet path 90.

The cylinder 71, as illustrated in FIG. 2, has formed therein an inlet port 81 which communicates with one(s) of the cavities 19c of the gear pump 19 through which the brake fluid is sucked into the gear pump 19. The inlet port 81 is formed in the end surface of the cylinder 71 which faces the gear pump 19 and extends to the outer circumference of the cylinder 71. The housing 101 has an inlet path 91 formed in the side wall of the mount chamber 101a. The inlet port 81 leads to the inlet path 91. The gear pump 19 works to suck the brake fluid through a hydraulic inlet circuit defined by the inlet path 91 and the intake port 81.

The sealing mechanism 115 is formed by a ring-shaped member with a center hole through which the drive shaft 54 passes. The sealing member 115 presses the outer rotor 39a and the inner rotor 39a against the cylinder 71 to hermetically isolate between a low-pressure region and a high-pressure region at one of ends of the gear pump 39. Specifically, the sealing mechanism 115 is placed in contact with an end surface of a mount chamber of the plug 72 in which the sealing mechanism 115 is disposed and selected portions of the end surfaces of the outer rotor 39a and the inner rotor 39b to create the hermetic seal.

The sealing mechanism 115 is made up of a hollow frame-like inner member 116, an annular rubber member 117, and a hollow frame-like outer member 118. The inner member 116 is fit in the outer member 118 with the annular rubber member 117 being placed between the outer peripheral wall of the inner member 116 and the inner peripheral wall of the outer member 118. The sealing mechanism 115 is designed to have a sealing surface facing in an opposite direction to that in which the sealing surface of the sealing mechanism 111 faces. In other words, the configuration of the sealing mechanism 115 is an mirror image of (i.e., symmetrical with) the sealing mechanism 111, but the sealing mechanism 115 is 180° out of phase with the sealing mechanism 111 around the drive shaft 54. Other arrangements are identical with those of the sealing mechanism 111, and explanation thereof in detail will be omitted here.

The sealing mechanism 115 has a radius that is a distance between the outer periphery thereof and the center of the drive shaft 54 in at least a lower portion of the cross section of the sealing mechanism 115, as viewed in FIG. 2, and smaller than a radius of an inner chamber of the plug 72, thereby creating an air gap between the sealing mechanism 115 and the plug 72 through which the brake fluid flows. The air gap defines a discharge chamber 82 which hydraulically connects with a connecting path 72b and an outlet path 92. The connecting path 72b is formed in the plug 72. The outlet path 92 is formed in the side wall of the mount chamber 101a of the housing 101. The gear pump 39 works to discharge the brake fluid through a hydraulic outlet circuit defined by the discharge chamber 82 and the connecting path 72b.

The cylinder 71 has opposed end surfaces serving as sealing surfaces which face the gear pumps 19 and 39, respectively. Specifically, each of the gear pumps 19 and 39 is placed in close contact with one of the sealing surfaces of the cylinder 71 to develop a mechanical seal therebetween to hermetically isolate between a low-pressure region and a high-pressure region developed between the end surface of the cylinder 71 and each of the gear pumps 19 and 39.

The cylinder 71, as illustrated in FIG. 2, has formed therein an inlet port 83 which communicates with one(s) of the cavities 39c of the gear pump 39 through which the brake fluid is sucked into the gear pump 39. The inlet port 83 is formed in the end surface of the cylinder 71 which faces the gear pump 39 and extends to the outer circumference of the cylinder 71. The housing 101 has an inlet path 93 formed in the side wall of the mount chamber 101a. The inlet port 83 leads to the inlet path 93. The gear pump 39 works to suck the brake fluid through a hydraulic inlet circuit defined by the inlet path 93 and the intake port 83.

The inlet path 91 and the outlet path 90 in FIG. 2 correspond to the hydraulic line C in FIG. 1. The inlet path 93 and the outlet path 92 in FIG. 2 correspond to the hydraulic line G in FIG. 1.

The cylinder 71 also has a sealing member 120 disposed in the center hole 71a thereof. The sealing member 120 is located behind the first bearing 51 in the insertion direction, that is, arranged close to the gear pump 39 than the first bearing 51 is. The sealing member 120 is made up of an annular resinous member 120a and an annular rubber member 120b. The annular resinous member 120a is of a U-shape in transverse section thereof extending in the pump radial direction. The annular rubber member 120b is fit within the annular resinous member 120a. The sealing member 120 is designed to have the annular resinous member 120a elastically compressed by the cylinder 71 and the drive shaft 54 to press the annular rubber member 120b, thereby creating a resultant reactive force to bring the annular resinous member 120b into abutment with the cylinder 71 and the drive shaft 54 to develop a hermetical seal therebetween. This hermetically isolates between two hydraulic flow paths: one for the gear pump 19 and the other for the gear pump 39 within the center hole 71a of the cylinder 71.

The plug 72 has three chambers defined within the center hole 72a. The three chambers are disposed adjacent each other and different in inner diameter from each other. The right one of the chambers, as viewed in FIG. 2 which will also be referred to as a first chamber below, is a chamber in which a sealing member 121 is disposed in the shape of a ring. The sealing member 121 is made up of an elastic ring 121a made of, for example, rubber and a resinous ring 121b. The resinous ring 121b has formed therein a groove which has a depth extending in a radial direction of the resinous ring 121b (i.e., the pump radial direction). The elastic ring 121a is fit in the groove of the resinous ring 121b. The elastic ring 121a elastically presses the resinous ring 121b into contact abutment with the periphery of the drive shaft 54.

A middle one of the chambers in the center hole 72a of the plug 72 located adjacent the sealing member 121, which will also be referred to as a second chamber below, is a chamber in which the sealing mechanism 115 is disposed. The connecting path 72b extends from the second chamber to the outer circumferential surface of the plug 72. The leftmost one of the chambers in the center hole 72a, which will also be referred to as a third chamber below, is a chamber in which a rear end portion (i.e., a right end portion, as viewed in the drawing) of the cylinder 71 is press-fit. The rear end portion of the cylinder 71 fit in the center hole 72a of the plug 71 is a small-diameter portion which is smaller in diameter than another major portion of the cylinder 71. The small-diameter portion of the cylinder 71 has a dimension (i.e., a length) in the axial direction of the cylinder 71 which is greater than that (i.e., a depth) of the third chamber in the axial direction of the plug 72, thereby creating an annular groove 74c between the front end of the plug 72 and the cylinder 71 (i.e., the shoulder between the small-diameter portion and the major portion of the cylinder 71) when the cylinder 71 is press-fit in the center hole 72a of the plug 72.

The plug 72 also has a fourth chamber defined in a rear portion (i.e., a right portion, as viewed in FIG. 2) of the center hole 72a. The fourth chamber is a chamber in which an oil seal 122 (i.e., a sealing member) is disposed. The oil seal 122 is fit on the drive shaft 54 and located closer to the motor 60 than the sealing member 121 is, that is, on the opposite side of the sealing member 121 to the gear pump 39. The sealing member 121, thus, works to avoid the leakage of the brake fluid from the center hole 72a outside the pump body 100. Additionally, the oil seal 122 blocks a possible leakage of the brake fluid through the sealing member 121. In other words, the sealing member 121 and the oil seal 122 function as a double sealing mechanism.

O-rings 73a, 73b, 73c, and 73d are each fit in the shape of an annular seal on the outer periphery of the pump housing 100. The O-rings 73a to 73d serve to hermetically block the leakage of the brake fluid between the above described two hydraulic flow paths: one for the gear pump 19 and the other for the gear pump 39 within the housing 101 and between an inlet and an outlet of each of the two hydraulic paths. Specifically, the O-ring 73a is disposed between a hydraulic path extending through the discharge chamber 80 and the outlet path 91 and a hydraulic path extending through the inlet port 81 and the inlet path 91. The O-ring 73b is disposed between a hydraulic path extending through the inlet port 81 and the inlet path 91 and a hydraulic path extending through the inlet port 83 and the inlet path 93. The O-ring 73c is disposed between a hydraulic path extending through the hydraulic path extending through the inlet port 83 and the inlet path 93 and a hydraulic line extending through the discharge chamber 82 and the outlet path 92.

The O-ring 73d is disposed between the hydraulic line extending through the discharge chamber 82 and the outlet path 92 and outside the housing 101. Each of the O-rings 73a to 73d is of an enclosed circular shape extending around the drive shaft 54 of the motor 60. The O-rings 73a, 73c, and 73d are arranged at substantially an equal interval away from each other in the axial direction of the pump body 100, while the O-ring 73d is disposed between the O-ring 73a and the O-ring 73c, thus permitting the axial length of the cylinder 71 (i.e., an overall axial length of the pump body 100) in the pump axial direction to be decreased.

The pump body 100 has formed in the outer periphery thereof grooves 74a, 74b, 74c, and 74d in the O-rings 73a to 73d are fit. Specifically, the grooves 74a and 74b are defined by annular recesses formed in the outer periphery of the cylinder 71. The groove 74c is defined by the shoulder formed on the front end of the above described small-diameter portion of the cylinder 71 and the front end of the plug 74. The groove 74d is defined by a recess formed in the outer periphery of the plug 72. The assembling of the pump body 100 and the housing 101 is achieved by inserting the pump body 100 with the O-rings 73a to 74d fit in the grooves 74a to 74d into the mount chamber 101a of the housing 101, thereby elastically compressing the O-rings 73a to 73d against the inner peripheral wall of the housing 101 to create hermetical seals.

The plug 72, as clearly illustrated in FIG. 2, has a large-diameter portion, a small-diameter portion, and a shoulder between the large-diameter portion and the small-diameter portion. The small-diameter portion is located closer to the opening of the mount chamber 101a (i.e., the motor 60) than the large-diameter portion is. The annular screw 102 (i.e., a retainer) is fit on the small-diameter portion of the plug 72 in abutment with the shoulder in thread engagement with the housing 101, thereby retaining the pump body 100 in the housing 101 firmly.

The pumping operation of the gear pump apparatus (i.e., the gear pumps 19 and 39) is achieved by rotation of the drive shaft 54 of the motor 60 to suck or discharge the brake fluid, thereby performing the anti-skid brake control mode or the motion control mode in the automotive brake system.

In the pumping operation of the gear pump apparatus, the discharge pressures, as produced by the gear pumps 19 and 39, are applied to the discharge chambers 80 and 82, respectively. This will cause the high pressure to be exerted on the end surfaces of the outer members 114 and 118 of the sealing mechanisms 111 and 115 which are farther away from the gear pumps 19 and 39, respectively, thereby pressing the outer members 114 and 118 against the cylinder 71 to bring the sealing surfaces of the outer members 114 and 118 (e.g., the end surface of the protrusion 114c of the first sealing mechanism 111) into constant abutment with the gear pumps 19 and 39. This creates hermetical seals on the end surfaces of the gear pumps 19 and 39 which face the sealing mechanisms 111 and 115 and also creates, as described above, the mechanical seals on the other end surfaces of the gear pumps 19 and 39.

When the discharge pressures, as produced by the gear pumps 19 and 39, are applied to the discharge chambers 80 and 82, it will cause the annular rubber members 113 and 117 to press, as described above, the pressure-exerted surfaces of the inner members 112 and 116 of the sealing mechanisms 111 and 115 in a direction perpendicular thereto. Specifically, the elastic pressure, as created by the annular rubber member 113, acts on the pressure-exerted surface of the inner member 112 substantially in the direction perpendicular thereto. This causes a component of the elastic pressure to develop thrust to push the inner member 112 away from the gear pump 19, thereby pressing the inner member 112 against the bottom surface of the mount chamber 101a to eliminate an air gap between the inner member 112 and the bottom surface of the mount chamber 101a. The same is true of the inner member 116 of the sealing mechanism 115. Specifically, the elastic pressure, as created by the annular rubber member 117, acts on the pressure-exerted surface of the inner member 116 substantially in the direction perpendicular thereto. This causes a component of the elastic pressure to develop, like the sealing mechanism 111, thrust to push the inner member 116 away from the gear pump 39, thereby pressing the inner member 116 against the end surface of the plug 74 to eliminate an air gap between the inner member 116 and the end surface of the plug 74.

The annular rubber members 113 and 117 are also pressed by the high discharge pressure of the gear pumps 19 and 39 against the bottom surface of the mount chamber 101a and the end surface of the plug 72. A combination of the annular rubber member 113 and the inner member 112, thus, produces a hermetical seal between inside (i.e., a low-pressure region) and outside (i.e., a high-pressure region) the annular rubber member 113. Similarly, a combination of the annular rubber member 117 and the inner member 116 produces a hermetical seal between inside (i.e., a low-pressure region) and outside (i.e., a high-pressure region) the annular rubber member 117.

In the above way, the inner members 112 and 116 are pressed into contact abutment with the bottom surface of the mount chamber 101a and the end surface of the plug 72, thus eliminating air gaps therebetween and also hermetically isolating the high-pressure regions from the low-pressure regions within the housing 101, respectively. This eliminates the undesirable leakage of hydraulic pressure within the housing 101 and minimizes the deterioration of durability of the annular rubber members 113 and 117 expected to arise from elastic deformation thereof into the air gaps. The annular rubber member 113 is responsive to a rise or a drop in discharge pressure of the gear pump 19 to increase or decrease the pressure acting on the pressure-exerted surface of the inner member 112, thereby minimizing the loss of torque required for the pumping operation of the gear pump 19. The same applies to the gear pump 39.

The pressure-exerted surface of the inner member 112 of the sealing mechanism 111, as described above, includes the slant surface 112e. The slant surface 112e works to convert the discharge pressure which is produced by the gear pump 19 and acts on the slant surface 112e in the direction perpendicular thereto into a vector component to thrust the inner member 112 away from the gear pump 19, thereby enhancing the elimination of the air gap between the bottom surface of the mount chamber 101a and the inner member 112. The elimination of the air gap avoids catching of the annular rubber member 113 between the bottom surface of the mount chamber 101a and the inner member 112, thereby minimizing the risk of breakage of the annular rubber member 113. The same is true of the inner member 116 of the sealing mechanism 115 for the gear pump 39.

Figure 8:
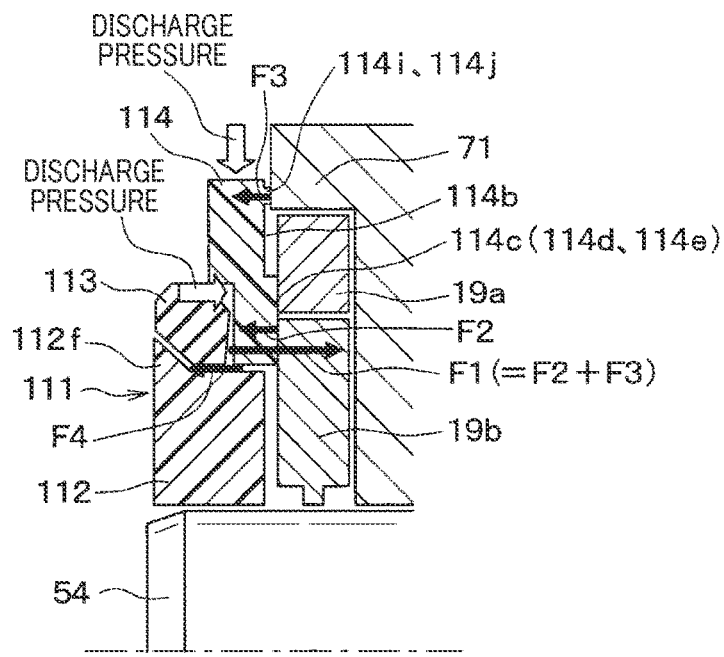
FIG. 8 is a schematic sectional view which demonstrate forces acting on parts of a gear pump apparatus in the first embodiment.

The outer member 114 is, as clearly illustrated in FIG. 8, urged by the pressing force F1 against the gear pump 19. The outer member 114 is also subjected to a counter force F2, as developed by pressure between the outer member 114 and the gear pump 19, so that it is pushed back from the gear pump 19. The outer member 114 is disposed at the first and second contacts 114i and 114j on one of ends of the cylinder 71 which are opposed to each other in the pump axial direction, so that it is subjected to a reactive force F3 and pushed back from the gear pump 19.

Specifically, the first and second contacts 114i and 114j of the outer member 114 are in contact with the end surface of the cylinder 71, thereby bearing or absorbing a part of the pressing force F1. This results in a decrease in pressure acting on an area of contact between an outer peripheral portion of the protrusion 114c of the outer member 114 and the outer rotor 19a, which leads to a drop in resistance to sliding between the outer rotor 19a and the outer member 114, thus decreasing a loss of torque required for the pumping operation of the gear pump 19.

Figure 7:
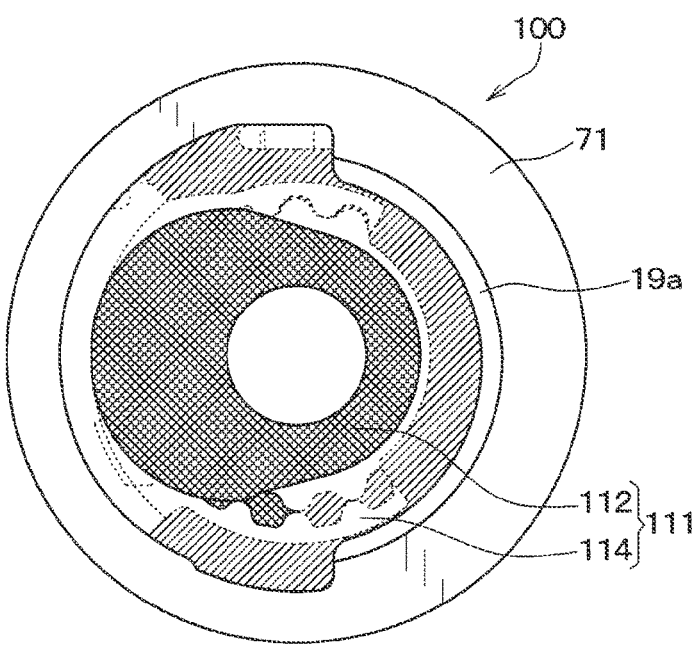
FIG. 7 is an illustration which shows a pressure distribution on a pump body, as viewed in a direction, as indicated by an arrow I in FIG. 2.

FIG. 7 illustrates a high-pressure region, as indicated by hatched lines, and a low-pressure region, as indicated by cross hatched lines, in the gear pump apparatus. Specifically, the pressure acting on the surface of the inner member 112 facing the gear pump 19 is lower, while the pressure acting on the recess 114b of the outer member 114 facing the gear pump 19 is higher. The pressure in the cavities 19c lying within the suction rotational range θ1 is lower, while the pressure in the cavities 19c lying outside the suction rotational range θ1 is higher.

Since the pressure in the cavities 19c within the suction rotational range θ1 is, as described above, lower, the counter force F2 is low within the first sliding range θ3 and the second sliding range θ4. Of the sliding contact area between the protrusion 114c of the outer member 114 and the outer rotor 19a, portions lying within the first sliding range θ3 and the second sliding range θ4 (i.e., cross-hatched areas in FIG. 6) are, therefore, subjected to a higher pressure.

The first and second contacts 114i and 114j of the outer member 114 are located within the first and second sliding ranges θ3 and θ4, respectively, thereby leading to a decrease in pressure acting on the sliding contact area between the protrusion 114c of the outer member 114 and the outer rotor 19a.

Second Embodiment

The gear pump apparatus of the second embodiment will be described below which is different in structure of the first and second contacts 114i and 114j from the first embodiment. Other arrangements are identical, and explanation thereof in detail will be omitted here.

Figure 9:
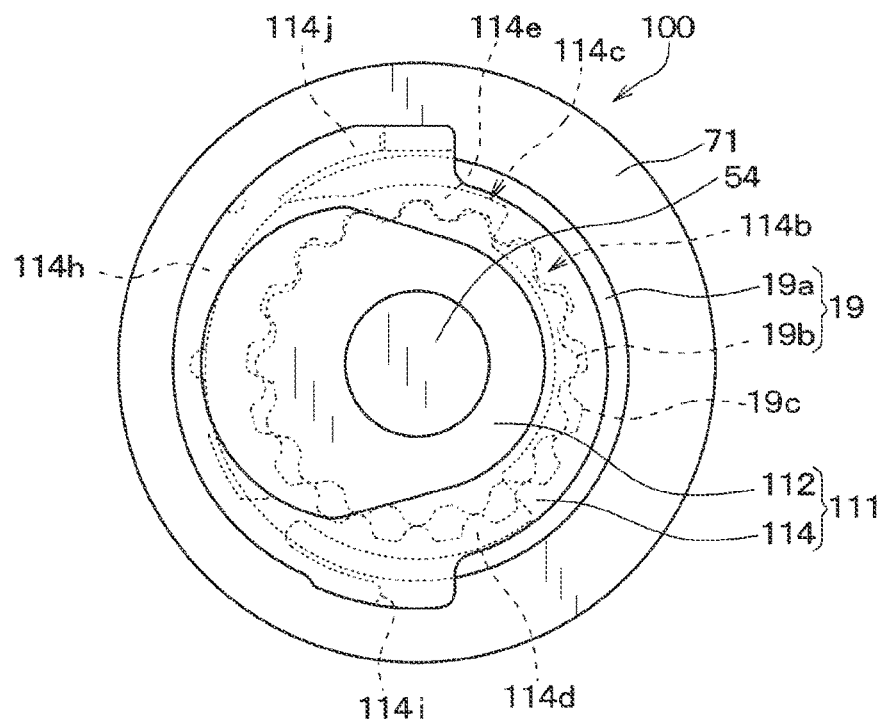
FIG. 9 is a view which shows layout of a pump body of a gear pump apparatus according to the second embodiment.

In the first embodiment, the first and second contacts 114i and 114j are located away from the protrusion 114c, but the outer member 114 of the second embodiment, as illustrated in FIG. 9, has the first and second contacts 114i and 114j shaped to continue or connect to the protrusion 114c.

The outer member 114 is resin-molded. The formation of the first and second contacts 114i and 114j located away from the protrusion 114c is achieved by injecting resin material into small recesses formed in a mold, while the formation of the first and second contacts 114i and 114j connecting with the protrusion 114c in the second embodiment is achieved by injecting a large recess formed in a mold. This method minimizes the risk of formation of air holes in the product of the outer member 114, thus resulting in increased accuracy of height of the first and second contacts 114i and 114j.

Locations of joints of the first and second contacts 114i and 114j to the protrusion 114c may be selected optionally. In the second embodiment, the first and second contacts 114i and 114j are connected to the third hermetically-sealing portion 114h of the protrusion 114c outside the outer circumference of the outer rotor 19a. Specifically, the first contact 114i extends from the third hermetically-sealing portion 114h in a direction opposite a direction of rotation of the rotors 19a and 19b. The second contact 114j extends from the third hermetically-sealing portion 114h in the direction of rotation of the rotors 19a and 19b.

In other words, the joints of the first and second contacts 114i and 114j to the protrusion 114c are located outside the sliding contact area of the rotors 19a and 19b and the outer member 114, thus avoiding an undesirable increase in the sliding contact area which will result in an increase in frictional resistance to the sliding motion of the rotors 19a and 19b which leads to a loss of torque required for the pumping operation of the gear pump 19.

Third Embodiment

The gear pump apparatus of the third embodiment will be described below which is different in structure of the first and second hermetically-sealing portions 114d and 114e of the outer member 114 from the first embodiment. Other arrangements are identical, and explanation thereof in detail will be omitted here. The structures of the first and second hermetically-sealing portions 114d and 114e may also be used with the gear pump apparatus of the second embodiment.

In each of the first and second embodiments, the first and second hermetically-sealing portions 114d and 114e of the outer member 114 are shaped to occupy or cover some of the cavities 19c during the pumping operation and also to minimize the sliding contact area between the outer member 114 and the assembly of the first and second rotors 19a and 19b. Specifically, each (or at least one) of the first and second hermetically-sealing portion 114d and 114e is designed to have an area whose outline which faces the outer periphery of the gear pump 19 extends substantially parallel to a portion of (i.e., along) an outer periphery of a region through which some of the cavities 19c pass, that is, a curve passing through roots of the internal teeth of the outer rotor 19a. In other words, each of the first and second hermetically-sealing portions 114d and 114e occupies a range between the curve passing through the roots of the internal teeth of the outer rotor 19a and a line extending at a given interval away from the curve in the radial direction of the outer member 114.

The above structure of the outer member 114 in each of the first and second embodiments faces the drawback in that a region in which the high discharge pressure exists outside the first and second hermetically-sealing portions 114d and 114e is relatively wide, thus resulting in an increase in load pressing the rotors 19a and 19b against the cylinder 71.

In other words, the structure of the outer member 114 in each of the first and second embodiments is designed so that the recess 114b communicates with the discharge chamber 80 and thus is subjected to the high-discharge pressure. This causes the high-discharge pressure to be exerted on the outer peripheral portion of the outer member 114 including the recess 114b during the pumping operation of the gear pump 19. An area of the gear pump 19, as indicated by hatched lines in FIG. 10, where the teeth of the rotors 19a and 19b exist and which overlaps the recess 114b is pressed by the high discharge pressure against the cylinder 71. Specifically, an expected pressure distribution between the gear pump 19 and the cylinder 71, as shown in FIG. 11, includes a discharge pressure region Ra, a suction pressure region Rb, and an intermediate pressure region Rc which is intermediate in pressure between the discharge pressure region Ra and the suction pressure region Rb. An overlap of the recess 114b in FIG. 10 with the intermediate pressure region Rc is subjected to an increased load pressing the gear pump 19 against the cylinder 71.

An increase in area subjected to the high discharge pressure will result in an increase in load pressing the rotors 19a and 19b against the cylinder 71, which will lead to an increase in mechanical wear of the rotors 19a and 19b and result in an increase in loss of torque required to rotate the rotors 19a and 19b.

In order to alleviate the above drawback, the first and second hermetically-sealing portions 114d and 114e of the outer member 114 of the third embodiment are, as clearly illustrated in FIGS. 12(a) to 12(e), designed to have additional areas 114k and 114l extending outwardly from major portions thereof (i.e., the above described areas of the first and second hermetically-sealing portions 114d and 114e). Specifically, the extended areas 114k and 114l of the first and second hermetically-sealing portions 114d and 114e are shaped to cover or occupy additional areas of the outer member 114, as illustrated in FIG. 13, extending outside the above described range between the curve passing through the roots of the internal teeth of the outer rotor 19a and the line extending at the given interval away from the curve in the radial direction of the outer member 114.

Figure 10:
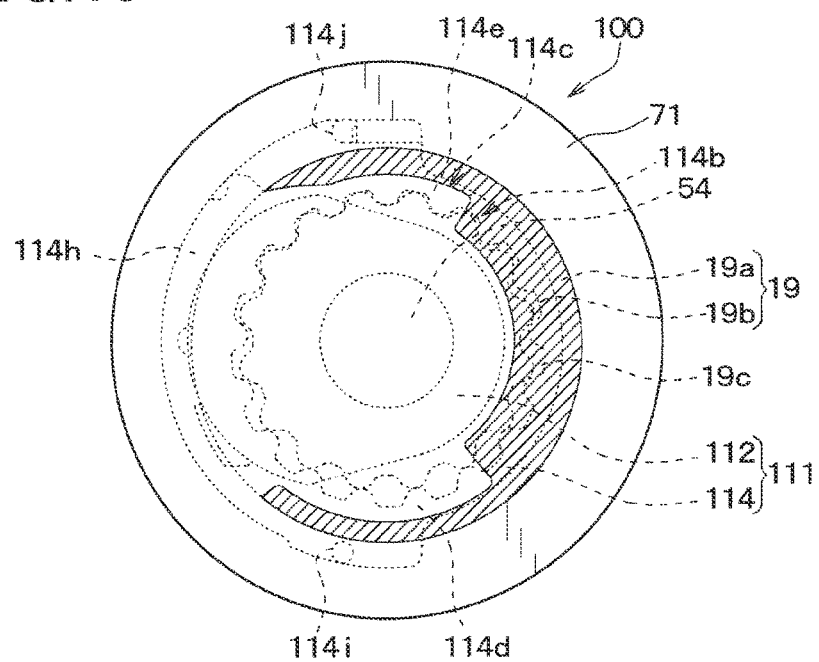
FIG. 10 is a view which demonstrates parts of a pump body of a gear pump apparatus of the third embodiment on which high pressure is exerted.
Figure 11:
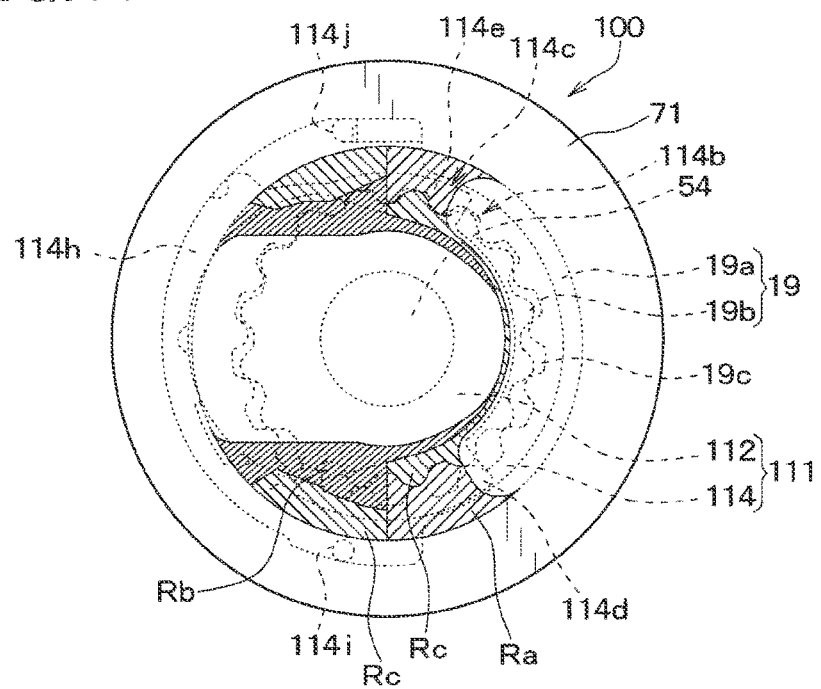
FIG. 11 is a view which illustrates a discharge pressure region Ra, a suction pressure region Rb, and an intermediate pressure region Rc in a gear pump apparatus of the third embodiment.

Specifically, if the first and second hermetically-sealing portions 114d and 114e, like in the first embodiment, do not have the extended areas 114k and 114l, a region, as indicated by hatched lines in FIG. 10, is subjected to the discharge pressure to increase the above described load pressing the rotors 19a and 19b against the cylinder 71. It is, thus, effective to extend the areas of the first and second hermetically-sealing portions 114d and 114e to regions, as hatched in FIG. 14. The first and second hermetically-sealing portions 114d and 114e of the third embodiment are, therefore, shaped to have the extended areas 114k and 114l occupying the hatched regions in FIG. 14.

Figure 13:
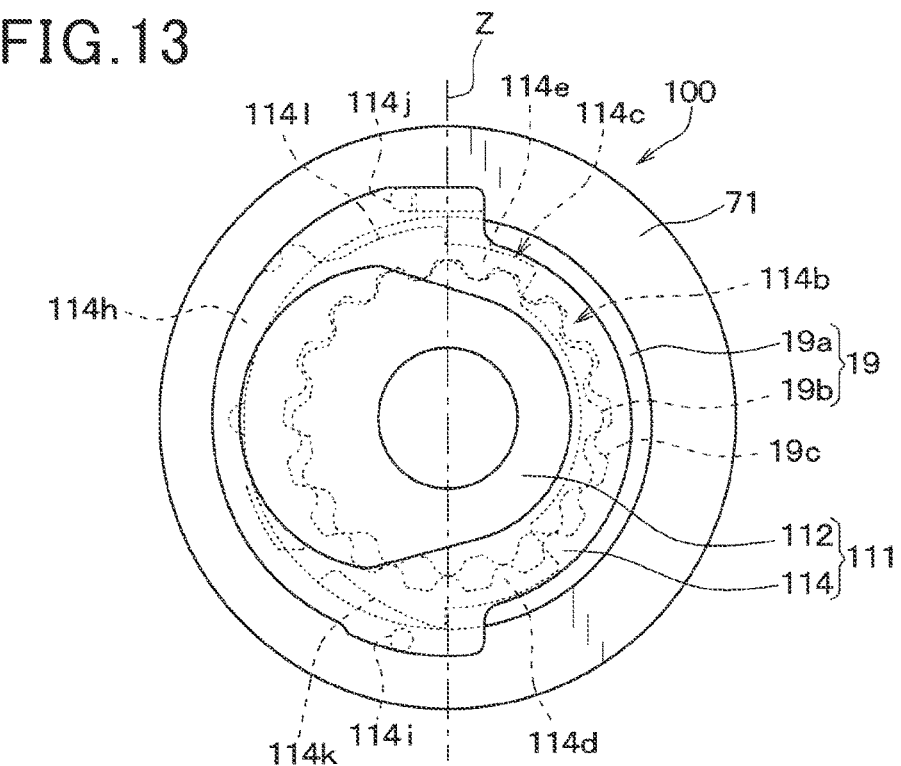
FIG. 13 is a view which shows the layout of a pump body of a gear pump apparatus of the third embodiment.

Each of the extended areas 114k and 114l of the third embodiment is shaped to have a dimension, as defined in the radial direction of the gear pump 19, which gradually increases from the suction side toward the discharge side of the gear pump 19 and terminates at the center line Z in FIG. 13 passing through one of the cavities 19c which is the largest in volume, one of the cavities 19c which is the smallest in volume, and the center of a traverse section of the drive shaft 54.

Figure 14:
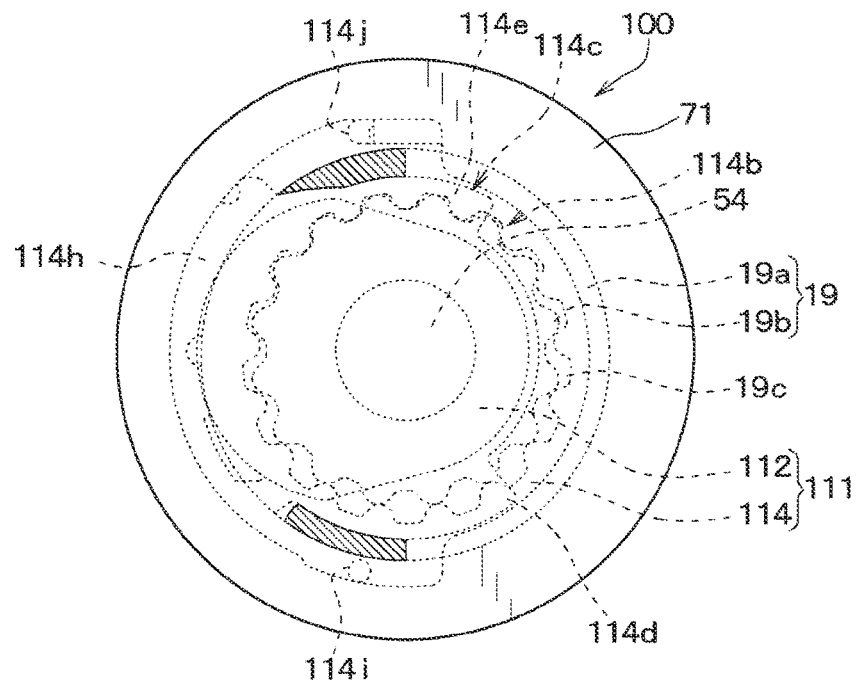
FIG. 14 is a view which illustrates regions to which areas of first and second hermetically-sealing portions of an outer member of a sealing mechanism are extended in the third embodiment.

The configuration of the extended areas 114k and 114l is optional within the hatched regions in FIG. 14, but however, too great a size of the extended areas 114k and 114l will result in too low an above described load pressing the rotors 19a and 19b against the cylinder 71, which leads to a lack in the sealing ability. It is desirable to decrease the width of, especially, a portion of each of the extended areas 114k and 114l within the suction side of a corresponding one of the hatched regions in FIG. 14 to ensure the stability in hermetically sealing between the discharge side and the suction side of the gear pump 19. For this purpose, each of the extended areas 114k and 114l is formed to have a dimension (i.e., the width) in the radial direction of the gear pump 19 which is smaller on the suction side than that on the discharge side, thereby increasing the pressure acting on the surface of the outer member 114 to create the hermetical seal between the discharge side and the suction side of the gear pump 19.

The extended areas 114k and 114l of the first and second hermetically-sealing portions 114d and 114e serve to narrow the region into which the high discharge pressure is inputted outside the first and second hermetically-sealing portions 114d and 114e, thereby lowering the load which will push the rotors 19a and 19b against the cylinder 71, which decreases the mechanical wear and the loss of rotational energy of the rotors 19a and 19b. The reasons why these beneficial effects are provided will be discussed below in detail with reference to FIGS. 15 and 16.

Figure 15:
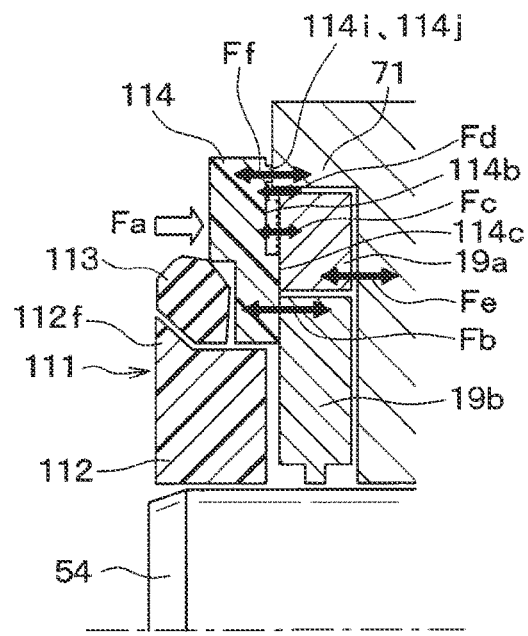
FIG. 15 is a schematic sectional view which demonstrates forces acting on parts of a gear pump apparatus in a case where first and second hermetically-sealing portions of an outer member of a sealing mechanism do not have extended areas.

In the case where the first and second hermetically-sealing portions 114d and 114e, like in the first embodiment, do not have the extended areas 114k and 114l, a plurality of forces acting on the gear pump 19, as illustrated in FIG. 15, meet relations below.

$$Fe = Fb + Fc + Fd \tag{1}$$

$$Fa = Fb + Fc + Fd + Ff = Fe + Ff \tag{2}$$

where Fa is a pressing force urging the outer member 114 against the gear pump 19, Fb is a counter force, as developed by pressure between the outer member 114 and the gear pump 19, Fc is a pressing force, as created by the discharge pressure in a region enclosed by a broken line in FIG. 15, which pushes the gear pump 19, Fd is a pressing force, as created by the discharge pressure, which pushes the gear pump 19 outside the first and second hermetically-sealing portions 114d and 114e, that is, outside the extended areas 114k and 114l in the pump radial direction, Fe is a counter force through which the gear pump 19 is pushed back by the cylinder 71, and Ff is a counter force through which the outer member 114 is pushed back at the first and second contacts 114i and 114j by the cylinder 71.

Since Fe is the counter force which is exerted from the left side in the drawing on the gear pump 19, that is, which is a reaction force to the forces Fb, Fc, and Fd, the above Eq. (1) is satisfied. Since Fa corresponds to the force which is exerted from the left side in the drawing on the outer member 114, the left side formula in the Eq. (2) is satisfied. By rewriting the left side formula using Eq. (1), we obtain the right side formula in Eq. (2).

In the case where the first and second hermetically-sealing portions 114d and 114e have the extended areas 114k and 114l, respectively, the pressing force Fc in FIG. 15 will be, as described above, lowered to Fc' demonstrated in FIG. 16. Since the forces Fa and Fd are unchanged, that is, identical with those in the case of FIG. 15, a difference of the pressing force Fc' in FIG. 16 from Fc in FIG. 15 is compensated for by the forces Fb and Ff. In other words, the forces Fb and Ff in the case of FIG. 15 are thought to be increased to forces Fb' and Fr in FIG. 16. If Fc' is equal to Fc/2, and an increase from Fb to Fb' and an increase from Ff to Ff' are expressed by a and β, respectively, we obtain relations of Fb'=Fb+α and Ff'=Ff+β. Since Fb+Fc+Ff=Fb'+Fc'+Ff', we obtain α+β=Fc/2.

The force Fa in the case where the first and second hermetically-sealing portions 114d and 114e have the extended areas 114k and 114l is, as shown by equations below, unchanged from that in the case where the first and second hermetically-sealing portions 114d and 114e do not have the extended areas 114k and 114l regardless of the above changes in Fb, Fc, and Ff.

$$Fa = Fb' + Fc' + Fd + Ff'\tag{3}$$
$$= (Fb + a) + (Fc/2) + Fd + (Ff + \beta)$$
$$= Fb + Fc + Fd + Ff$$

Figure 16:
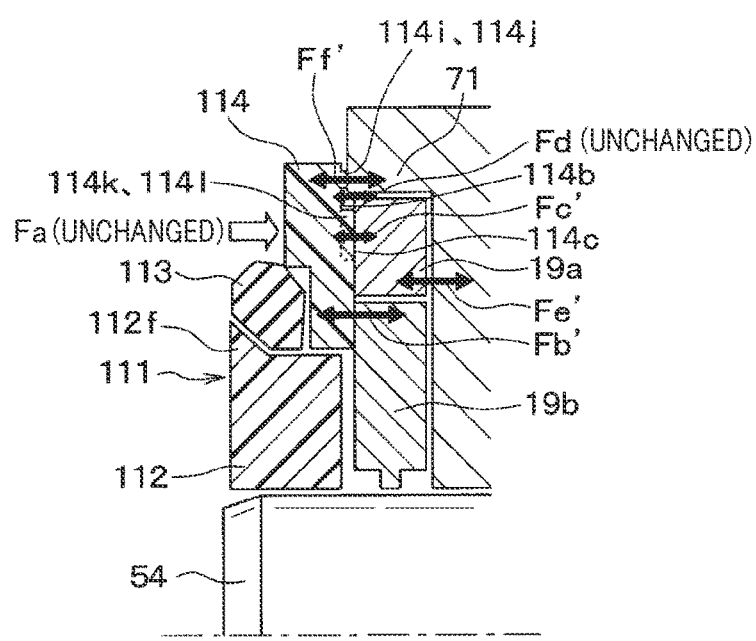
FIG. 16 is a schematic sectional view which demonstrates forces acting on parts of a gear pump apparatus in a case where first and second hermetically-sealing portions of an outer member of a sealing mechanism have extended areas.

The counter force Fe through which the gear pump 19 is pushed back by the cylinder 71 in the case of FIG. 16 is given by $$Fe = Fb' + Fc' + Fd \quad (4)$$
$$= (Fb + a) + (Fc/2) + Fd$$
$$= Fb + Fc + Fd + a - Fc/2$$
$$= Fb + Fc + Fd - \beta$$

The above Eq. (4) shows that the value of Fe (i.e., Fe') in the case of FIG. 16 where the first and second hermetically-sealing portions 114d and 114e have the extended areas 114k and 114l is smaller by β than that in the case of FIG. 15. The extended areas 114k and 114l, thus, serve to decrease the region into which the high discharge pressure is inputted outside the first and second hermetically-sealing portions 114d and 114e in the pump radial direction, thereby lowering the load which will push the rotors 19a and 19b against the cylinder 71, which decreases the mechanical wear and the loss of rotational energy of the rotors 19a and 19b.

MODIFICATIONS

The gear pump apparatus of each of the above embodiments is, as described above, equipped with two internal gear pumps: the gear pumps 19 and 39, but may alternatively be designed to have a single gear pump.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The elements constituting each of the above embodiments are not necessarily needed unless otherwise specified as being needed or believed to be required in principle.

The number of the elements of each of the embodiments, the numerical values, the quantities, and the values specifying the regions referred to in the embodiments are optional unless otherwise specified or believed to be essential in principle.

The configurations or positional relations of the elements of each of the embodiments are not necessarily limited to those indicated in the disclosure unless otherwise specified or believed to be essential in principle.

For instance, the outer member 114 is equipped with the first and second contacts 114i and 114j which are diametrically opposed to each other and placed in abutment with the end surface of the gear pump 19, but however may have a plurality of either or both types of first contacts 114i and second contacts 114j which are placed in abutment with the end surface of the gear pump 19.

The first and second contacts 114i and 114j are, as described above, located within the first and second sliding ranges θ3 and θ4, but however, may alternatively be formed on another location. For instance, the first and second contacts 114i may be located outside the suction rotational range θ1, preferably close to the perimeter of the suction rotational range θ1 outside it in terms of the beneficial effects offered by the first and second contacts 114i and 114j.

Particularly, in the case where the outer member 114 includes a plurality of first contacts 114i and a plurality of second contacts 114j, they do not necessarily needed to be lie within the first and second sliding ranges θ3 and θ4. It is advisable that at least one of the first and second contacts 114i and 114j be located within a corresponding one of the first and second sliding ranges θ3 and θ4 in terms of the beneficial effects offered thereby.

The pressure-exerted surface of the inner member 112 of the sealing mechanism 111 to which the pressure, as produced by the deformation of the rubber member 113, is applied is, as described above, made by the slant surface 112b of the flange 112f. The flange 112f extends cover the whole of circumference of the inner member 112, but may be formed on at least a portion of the outer periphery of the inner member 112 or made up of one or more discrete protrusions formed on the outer periphery of the inner member 112 to define the pressure-exerted surface working as a pressure converter to convert the pressure exerted by the rubber member 113 into force to move the inner member 112 away from the gear pump 19 toward the inner surface of the wall of the housing 101 which is on the opposite side of the sealing mechanism 111 to the gear pump 19. The flange 112f may alternatively be omitted. The same is true of the inner members 116, 222, and 226.

The first and second hermetically-sealing portions 114d and 114e in the third embodiment are, as described above, equipped with the extended areas 114k and 114j, respectively, but however, at least one of the first and second hermetically-sealing portions 114d and 114e may have a corresponding one of the extended areas 114k and 114j.

Figure 17:
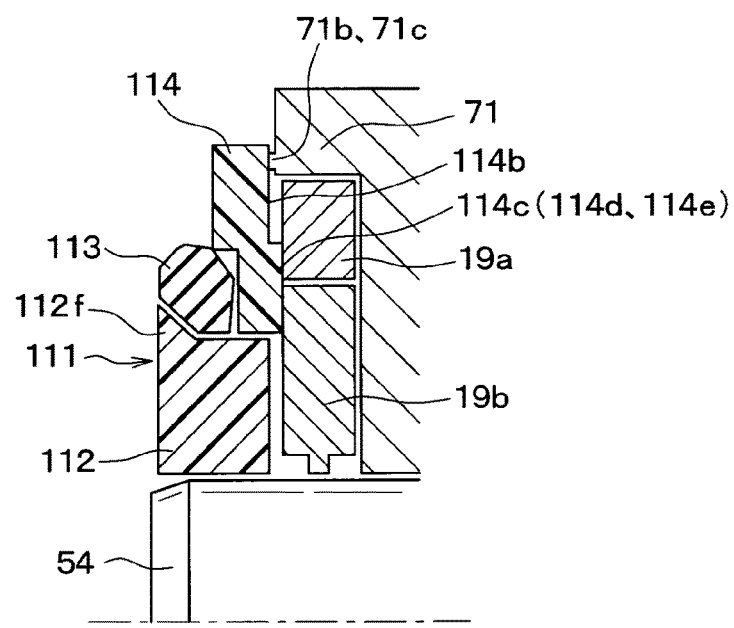
FIG. 17 is a partially sectional view which illustrates a modification of a gear pump apparatus.
Figure 18:
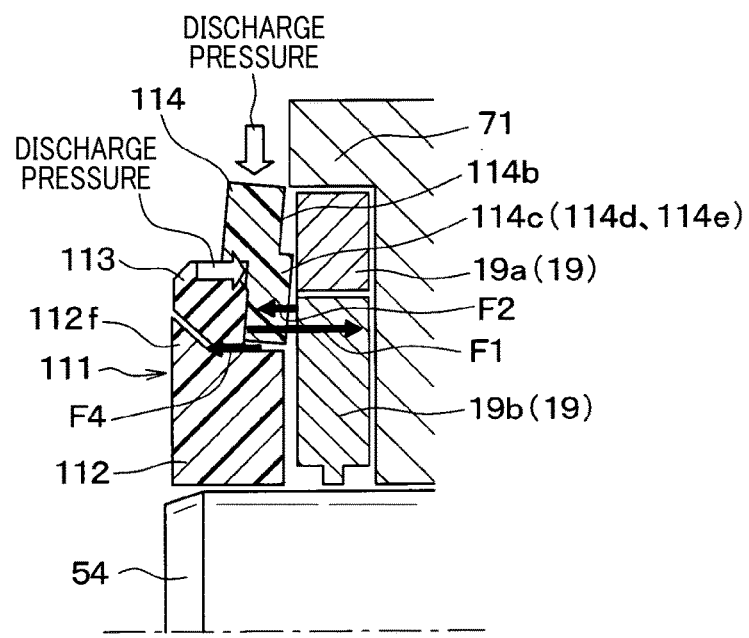
FIG. 18 is a schematic sectional view which demonstrates forces acting on parts of a conventional gear pump apparatus.

The first and second contacts 114i and 114j in each of the first to third embodiments are provided on the outer member 114, but however, they may be omitted. This is because the outer member 114 has at least the third hermetically-sealing portion 114h placed in direct contact with the gear pump 19. For instance, the cylinder 71 may instead be designed, as illustrated in FIG. 17, to have first and second contacts 71b and 71c in the form of a protrusion working as a mechanical support placed in contact abutment with the end surface of the outer member 114. The first and second contacts 71b and 71c are located outside the first and second hermetically-sealing portions 114d and 114e in the pump radial direction. In other words, it is advisable that a contact member (i.e., at least one of the contacts 114i, 114j, 71b, and 71c be provided on one of the outer member 114 and a casing (i.e., the cylinder 71 and the pump body 101), located outside a portion of the outer member 114 which contacts one of the axially opposed ends of the gear pump 19 in the radial direction of the gear pump 19, and placed to create a physical contact between the outer member 114 and one of the axially opposed ends of the casing.

What is claimed is:

1. A gear pump apparatus comprising:
   a gear pump which includes an outer gear and an inner gear meshing with the outer gear so as to define a plurality of cavities, the outer and inner gears being rotated through a drive shaft to suck and discharge fluid in a pumping operation;
   a casing which has defined therein a chamber in which the gear pump is disposed;
   a sealing mechanism which is disposed between an outer wall of the casing and said gear pump, said sealing mechanism working to create a hermetical seal between a low-pressure region and a high-pressure region, the low-pressure region including a suction side of the gear pump into which the fluid is sucked and a peripheral region of the drive shaft, the high-pressure region including a discharge side from which the fluid is discharged, said sealing mechanism including an annular rubber member, an outer member, and an inner member, the annular rubber member surrounding the low-pressure region to create a hermetical seal between the low-pressure region and the high-pressure region, the outer member being placed in contact with one of axially opposed ends of the casing and one of axially opposed ends of the gear pump, the inner member having an outer peripheral wall on which the annular rubber member is fit and being disposed inside the outer member, the inner member being arranged in contact with an inner surface of the outer wall of said casing, the inner surface facing an opposite side of the inner member to said gear pump; and a contact member which is provided on one of said outer member and said casing and located outside a portion of the outer member which contacts the one of the axially opposed ends of the gear pump in a radial direction of the gear pump, the contact member being placed to create a physical contact between the outer member and the one of the axially opposed ends of the casing.

2. A gear pump apparatus as set forth in claim 1, wherein said contact member is disposed within a suction rotational range that is defined by an angle through which the gear pump rotates to suck the fluid in the pumping operation.

3. A gear pump apparatus as set forth in claim 1, wherein said outer member has formed on one of end surfaces which faces the gear pump a protrusion placed in contact with the casing and the gear pump to hermetically seal between the low-pressure region and the high-pressure region, said outer member also having formed on the one of the end surfaces a recess placed out of contact with the casing and the gear pump, and wherein the contact member is defined by a protrusion formed on the recess of the outer member.

4. A gear pump apparatus as set forth in claim 3, wherein said protrusion includes a first hermetically-sealing portion, a second hermetically-sealing portion, and a third hermetically-sealing portion, the first hermetically-sealing portion serving to close one of the cavities which is the largest in volume thereof, the second hermetically-sealing portion serving to close one of the cavities which is the smallest in volume thereof, the third hermetically-sealing portion being located between the first and second hermetically-sealing portions, and wherein the contact member is shaped to connect with the third hermetically-sealing portion.

5. A gear pump apparatus as set forth in claim 4, wherein the contact member is connected to the third hermetically-sealing portion outside an outer circumference of the outer rotor.

6. A gear pump apparatus as set forth in claim 4, wherein at least one of the first and second hermetically-sealing portions is shaped to have an area whose outline which faces an outer periphery of the gear pump extends along a periphery of a region through which the cavities pass and additionally has an extended area which extends outside said area toward the outer periphery of the gear pump.

7. A gear pump apparatus as set forth in claim 6, wherein the extended area is shaped to have a dimension, as defined in a radial direction of the gear pump, which gradually increases from the suction side toward the discharge side of the gear pump.

8. A gear pump apparatus as set forth in claim 1, wherein an outer peripheral wall of said inner member has formed thereon a flange which is shaped to have a pressure-exerted surface to which pressure, as produced by deformation of the annular rubber member arising from application of discharge pressure of said gear pump, is applied to create thrust to move the inner member toward the inner surface of the outer wall of said casing.

9. A gear pump apparatus comprising:
a gear pump which includes an outer gear and an inner gear meshing with the outer gear so as to define a plurality of cavities, the outer and inner gears being rotated through a drive shaft to suck and discharge fluid in a pumping operation;
a casing which has defined therein a chamber in which the gear pump is disposed; and
a sealing mechanism which is disposed between an outer wall of said casing and said gear pump, said sealing mechanism working to create a hermetical seal between a low-pressure region and a high-pressure region, the low-pressure region including a suction side of the gear pump into which the fluid is sucked and a peripheral region of the drive shaft, the high-pressure region including a discharge side from which the fluid is discharged, said sealing mechanism including an annular rubber member, an outer member, and an inner member, the annular rubber member surrounding the low-pressure region to create a hermetical seal between the low-pressure region and the high-pressure region, the outer member being placed in contact with one of axially opposed ends of the casing and one of axially opposed ends of the gear pump, the inner member having an outer peripheral wall on which the annular rubber member is fit and being disposed inside the outer member, the inner member being arranged in contact with an inner surface of the outer wall of said casing, the inner surface facing an opposite side of the inner member to said gear pump,
wherein said outer member has formed on one of end surfaces thereof which faces the gear pump a protrusion placed in contact with one of the casing and the gear pump to define the low-pressure region and the high-pressure region, said outer member also having formed on the one of the end surfaces a recess placed out of contact with the casing and the gear pump,
wherein said protrusion includes a first hermetically-sealing portion, a second hermetically-sealing portion, and a third hermetically-sealing portion, the first hermetically-sealing portion serving to close one of the cavities which is the largest in volume thereof, the second hermetically-sealing portion serving to close one of the cavities which is the smallest in volume thereof, the third hermetically-sealing portion being located between the first and second hermetically-sealing portions on a suction side of the gear pump, and
wherein at least one of the first and second hermetically-sealing portions also includes an extended area which extends toward the outer periphery of the gear pump outside an area whose outline which faces an outer periphery of the gear pump extends along a periphery of a region through which the cavities pass.

10. A gear pump apparatus as set forth in claim 9, wherein the extended area is shaped to have a dimension, as defined in a radial direction of the gear pump, which gradually increases from the suction side toward the discharge side of the gear pump.

11. A gear pump apparatus as set forth in claim 9, wherein the outer member includes a contact member which is located outside a portion of the outer member which contacts the one of the axially opposed ends of the gear pump in a radial direction of the gear pump, the contact member being placed to create a physical contact between the outer member and the one of the axially opposed ends of the casing.

12. A gear pump apparatus as set forth in claim 11, wherein said contact member is disposed within a suction rotational range that is defined by an angle through which the gear pump rotates to suck the fluid in the pumping operation.

13. A gear pump apparatus as set forth in claim 9, wherein an outer peripheral wall of said inner member has formed thereon a flange which is shaped to have a pressure-exerted surface to which pressure, as produced by deformation of the annular rubber member arising from application of discharge pressure of said gear pump, is applied to create thrust to move the inner member toward the inner surface of the outer wall of said casing.

* * * * *

UNITED STATES PATENT AND TRADEMARK OFFICE
CERTIFICATE OF CORRECTION

Page 1 of 1

PATENT NO. : 9,835,155 B2
APPLICATION NO. : 14/796198
DATED : December 5, 2017
INVENTOR(S) : Hashiba et al.

It is certified that error appears in the above-identified patent and that said Letters Patent is hereby corrected as shown below:

On the Title Page

Item (73), (Assignee) at Line 12, Change "ADVICS Co., Ltd., Kariya (JP)" to --ADVICS Co., Ltd., Kariya, Aichi-pref. (JP)--.

Signed and Sealed this
Twenty-fourth Day of July, 2018

Andrei Iancu
*Director of the United States Patent and Trademark Office*